United States Patent
Belz et al.

(10) Patent No.: US 7,053,953 B2
(45) Date of Patent: May 30, 2006

(54) METHOD AND CAMERA SYSTEM FOR BLURRING PORTIONS OF A VERIFICATION IMAGE TO SHOW OUT OF FOCUS AREAS IN A CAPTURED ARCHIVAL IMAGE

(75) Inventors: Steven M. Belz, Pittsford, NY (US); James E. Adams, Rochester, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 859 days.

(21) Appl. No.: 10/028,644

(22) Filed: Dec. 21, 2001

(65) Prior Publication Data

US 2003/0117511 A1    Jun. 26, 2003

(51) Int. Cl.
*H04N 5/232* (2006.01)
*G03B 13/00* (2006.01)

(52) U.S. Cl. .................. 348/346; 345/333.02
(58) Field of Classification Search ............... 348/345, 348/346, 348, 350, 354, 355, 356, 207.1, 348/207.11, 347; 382/264, 250, 255, 263, 382/266, 272, 291, 172, 282, 25
See application file for complete search history.

(56) References Cited

U.S. PATENT DOCUMENTS

| | | | |
|---|---|---|---|
| 3,971,065 A | 7/1976 | Bayer | |
| 4,463,384 A * | 7/1984 | Fujikawa et al. | 348/346 |
| 4,642,678 A | 2/1987 | Cok | |
| 4,685,143 A | 8/1987 | Choate | |
| 4,955,064 A | 9/1990 | Shirasaka et al. | |
| 4,969,202 A | 11/1990 | Groezinger | |
| 5,001,507 A | 3/1991 | Iida et al. | |
| 5,016,107 A | 5/1991 | Sasson et al. | |
| 5,081,689 A | 1/1992 | Meyer et al. | |
| 5,103,254 A | 4/1992 | Bell et al. | |
| 5,142,380 A | 8/1992 | Sakagami et al. | |

(Continued)

FOREIGN PATENT DOCUMENTS

EP        964585 A2 * 12/1999

*Primary Examiner*—David Ometz
*Assistant Examiner*—Nelson D. Hernandez
(74) *Attorney, Agent, or Firm*—Roland R. Schindler, II

(57) ABSTRACT

In one aspect of the present invention, a method is provided for using a display having a predetermined display resolution to show out of focus areas in an archival image having a greater resolution than the predetermined display resolution. In this method, a verification image sized for presentation on the display, is provided. Portions of the archival image that are out of focus are identified. The verification image is blurred so that portions of the verification image that correspond to out of focus portions of the archival image appear out of focus when the verification image is presented on the display.

In another aspect a camera system is provided having a source of an archival image with a predetermined resolution and a verification display having an image display resolution that is lower than the predetermined resolution of the archival image. A signal processor is provided, with said signal processor processing the archival image to identify out of focus portions of the archival image and to form a verification image formatted for presentation on the verification display said signal processor further modifying the appearance of the verification image so that portions of the verification image that correlate to identified portions of the archival image appear out of focus when the modified verification image is presented on the verification display.

25 Claims, 17 Drawing Sheets

U.S. PATENT DOCUMENTS

| | | |
|---|---|---|
| 5,164,831 A | 11/1992 | Kuchta et al. |
| 5,172,227 A * | 12/1992 | Tsai et al. ................ 375/240.2 |
| 5,227,824 A | 7/1993 | Yoshida et al. |
| 5,361,119 A | 11/1994 | Shida et al. |
| 5,373,322 A | 12/1994 | Laroche et al. |
| 5,440,369 A | 8/1995 | Tabata et al. |
| 5,444,798 A | 8/1995 | Enomoto et al. |
| 5,446,804 A | 8/1995 | Allebach et al. |
| 5,455,654 A | 10/1995 | Suzuki |
| 5,496,106 A | 3/1996 | Anderson |
| 5,557,328 A | 9/1996 | Ishihama et al. |
| 5,557,358 A | 9/1996 | Mukai et al. |
| 5,563,718 A | 10/1996 | Wober et al. |
| 5,634,040 A | 5/1997 | Her et al. |
| 5,666,566 A | 9/1997 | Gu et al. |
| 5,668,597 A | 9/1997 | Parulski et al. |
| 5,680,481 A * | 10/1997 | Prasad et al. ............... 382/190 |
| 5,697,001 A | 12/1997 | Ring et al. |
| 5,710,954 A | 1/1998 | Inoue |
| 5,715,483 A | 2/1998 | Omata et al. |
| 5,745,175 A * | 4/1998 | Anderson .................... 348/345 |
| 5,874,994 A | 2/1999 | Xie et al. |
| 5,877,809 A | 3/1999 | Omata et al. |
| 5,892,991 A | 4/1999 | Hamada et al. |
| 5,909,598 A | 6/1999 | Kadohara |
| 5,978,027 A * | 11/1999 | Takeda ....................... 348/348 |
| 6,023,531 A * | 2/2000 | Peters ........................ 382/232 |
| 6,067,114 A | 5/2000 | Omata et al. |
| 6,252,994 B1 * | 6/2001 | Nafarieh ..................... 382/253 |
| 6,356,663 B1 * | 3/2002 | Korta et al. ................. 382/239 |
| 6,359,650 B1 * | 3/2002 | Murakami ............. 348/333.04 |
| 6,408,140 B1 | 6/2002 | Desormeaux |
| 6,421,087 B1 * | 7/2002 | Ikeda ......................... 348/345 |
| 6,556,784 B1 * | 4/2003 | Onuki ........................... 396/52 |
| 6,697,109 B1 * | 2/2004 | Daly ........................... 348/268 |
| 2001/0016680 A1 * | 8/2001 | Minami et al. ............. 600/167 |
| 2002/0018124 A1 * | 2/2002 | Mottur et al. ............... 348/211 |

* cited by examiner

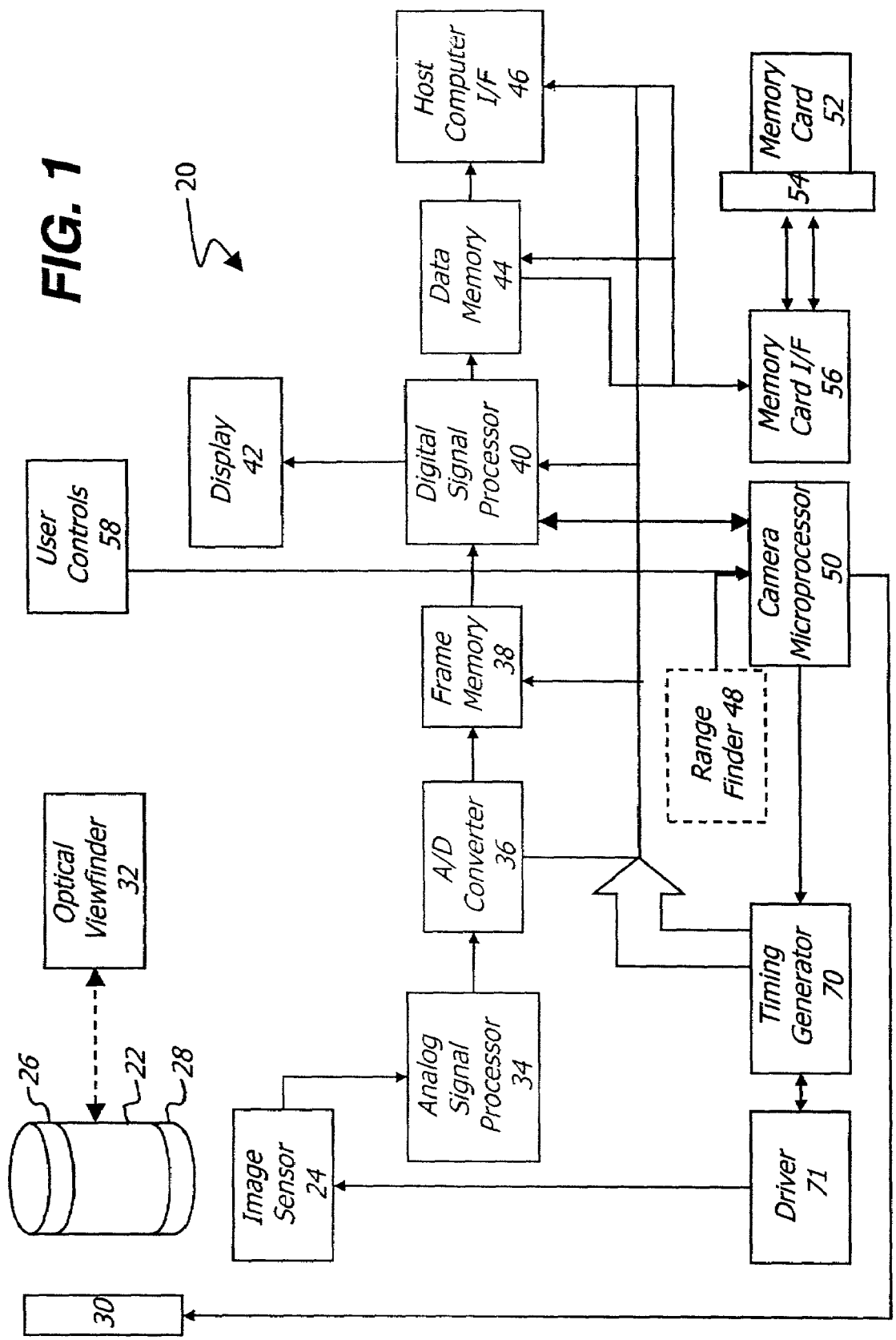

METHOD AND CAMERA SYSTEM FOR BLURRING PORTIONS OF A VERIFICATION IMAGE TO SHOW OUT OF FOCUS AREAS IN A CAPTURED ARCHIVAL IMAGE

CROSS REFERENCE TO RELATED APPLICATIONS

Cross reference is made to related application Ser. No. 09/176,805 filed Oct. 22, 1998.

FIELD OF THE INVENTION

The present invention relates generally to the field of electronic imaging, and in particular, a verifying camera system that visibly blurs portions of a verification image that correspond to portions of an archival image which are out of focus.

BACKGROUND OF THE INVENTION

Many camera systems capture archival images using an optical system containing an automatic focus lens with a limited depth of focus. In these systems, the user generally centers the subject in the viewfinder and the camera lens autofocus control algorithm moves the lens focus position based on the sharpness of the subject either at a single spot or in multiple zones. Some cameras alternatively use a distance measure feedback from a discrete sensor to set a focus position. However, since in many cameras the user is not seeing the scene through the archival optical system, it is not possible for the user to determine whether the captured image is focused at the correct depth, and therefore, on the correct subject.

In cameras that incorporate an electronic image capture system, a liquid crystal display (LCD), or other type of electronic display is often used to present an image of the photographic scene. This image can be reviewed by the photographer while the photographer is at the scene of the photograph. This permits the photographer to verify whether the captured image is acceptable and to determine whether the photographer should capture another image of the scene.

Cameras having the capability to present an image of a captured scene to a camera user are referred to generally herein as verifying cameras. Verifying cameras form two images during image capture: an archival image and a verification image. The verification image is an image that is adapted to match the appearance of the archival image. The verification image can be derived from the archival image as is typically done with digital still cameras. The verification image can also be captured using an image capture system that is separate from that used to capture the archival image. This is done in cameras such as hybrid film/electronic cameras as described in combination cameras incorporating dual electronic image capture systems as described in U.S. Pat. No. 5,710,954.

One drawback of the use of verifying cameras is that most displays currently in use with such cameras are relatively small, thus making it difficult to determine the sharpness of the captured image. This is a particular problem when the verifying camera includes a so called "digital zoom" or "pseudo zoom" capability. In these cameras, the captured archival image is cropped and magnified before it is used (e.g. before the film is printed, or before the digital file is stored), so that the full image area of the film or electronic sensor is not used. In such a camera, the sharpness of the captured rendered image (e.g., a print made from the cropped magnified archival image) is greatly reduced as the level of zoom increases. However, this decrease in sharpness may not be readily apparent in the verification image that is presented on the display.

Thus, what is needed is a camera system that presents a verification image that indicates which portions of a captured archival image are out of focus.

Commonly-assigned U.S. Pat. No. 5,103,254, entitled "Camera with Subject Highlighting and Motion Detection," discloses a camera in which a gradient operation is performed on an electronically captured image, in order to produce an outline of subjects within the depth of field. This outline is displayed using a liquid crystal display (LCD) as a mask to highlight the in-focus subject within the camera's viewfinder. U.S. Pat. No. 5,496,106, entitled "System and Method of Generating a Contrast Overlay as a Focus Assist for an Imaging Device," discloses a system in which an image is split into its red, green, and blue components, a contrast signal is generated, and the contrast signal is combined with one of the color channels to produce a false-color overlay. Although the methods described in these patents provide focus detection, additional processing of the image is needed to produce the focus detection information. Further, overlays do not indicate out of focus areas in an intuitively understandable manner. An untrained user can misconstrue the meanings of the overlay markings. This in turn can cause the user to make incorrect decisions regarding whether to capture an additional image of the scene. Thus, what is needed is a method and camera that is adapted to present verification images on a display in a manner that intuitively indicates which portions of the archival image are out of focus.

SUMMARY OF THE INVENTION

Accordingly, an object of the present invention is to effectively determine which portion(s) of an archival image are out of focus, and to display a verification image that shows the out of focus portions of the archival image as blurred when presented on an electronic display.

In one aspect of the present invention, a method is provided for using a display having a predetermined display resolution to show out of focus areas in an archival image having a greater resolution than the predetermined display resolution. In this method, a verification image sized for presentation on the display is provided. Portions of the archival image that are out of focus are identified. The verification image is blurred so that portions of the verification image that correspond to out of focus portions of the archival image appear out of focus when the verification image is presented on the display.

In another aspect a camera system is provided having a source of an archival image with a predetermined resolution and a verification display having an image display resolution that is lower than the predetermined resolution of the archival image. A signal processor is provided, with said signal processor processing the archival image to identify out of focus portions of the archival image and to form a verification image formatted for presentation on the verification display. The signal processor further modifys the appearance of the verification image so that portions of the verification image that correlate to identified portions of the archival image appear out of focus when the modified verification image is presented on the verification display.

In another aspect of the present invention, a camera system is provided for capturing an archival image and displaying a verification image. The camera system has a digital image capture system for capturing an archival image having a predetermined imaging resolution, a display, having a display resolution lower than the predetermined imaging resolution for presenting a verification image and a signal processor receiving the archival image and forming a verification image of the archival image, identifying portions of the archival image that are out of focus and modifying the verification image so that when the verification image is displayed on the display, the portions of the verification image that correspond to portions of the archival image that are out of focus appear out of focus.

In still another aspect of the present invention, a camera system is provided for generating a verification image. The camera system has an image sensor to convert light incident on said sensor into a digital representation of an image formed on the image sensor. A taking lens unit is provided having an adjustable focus distance for focusing light to form an image on the image sensor. A camera microprocessor controls the adjustment of the lens taking unit. A range finder determines the distance from the camera to various spots in a scene with the range finder determining a distance from the camera to the subject and setting the lens taking unit so that the image formed at the image sensor is focused at the distance defined by the range finder. The signal processor is connected to the image sensor to receive the image. The signal processor forms an archival image and verification image that is representative of the archival image and adapted for display on a video display having a resolution that is lower than the resolution of the image sensor. The digital signal processor uses data regarding the focused distance of the taking lens unit to determine whether portions of the archival image are out of focus. The digital signal processor modifies the verification image so that out of focus portions of the archival image are blurred, so that portions of the verification image that correlate to out of focus portions of the archival image appear out of focus when the verification image is presented on the video display.

BRIEF DESCRIPTION OF THE DRAWINGS

FIG. 1 is a block diagram of an embodiment of digital camera utilizing the present invention;

FIG. 2b shows one embodiment of an icon and text message that can be used to indicate resolution reductions occurring as a result of zoom activation;

FIG. 2c shows another embodiment of an icon and test message that can be used to indicate resolution reductions occurring as a result of digital zoom activation;

FIG. 2d shows an embodiment of an icon and test message that can be used to indicate reduced resolution created by the anticipated output size of the rendered image;

FIG. 2e shows an embodiment of a general icon that can be used to indicate high resolution;

FIG. 2f shows an embodiment of an icon that can be used in connection with the icon of FIG. 2e to indicate reduced resolution;

FIG. 2g shows an embodiment of a general icon in conjunction with the embodiments of FIGS. 2e, and 2f to indicate reduced resolution;

FIG. 2h shows another embodiment of a general icon that can be used to indicate high resolution;

FIG. 2i shows another embodiment of a general icon that can be used in conjunction with the icon of FIG. 2h to indicate normal resolution;

FIG. 2j shows an embodiment of a general icon that can be used in conjunction with the embodiments of FIGS. 2h and 2i indicate reduced resolution.

DETAILED DESCRIPTION OF THE INVENTION

Figure 2A:
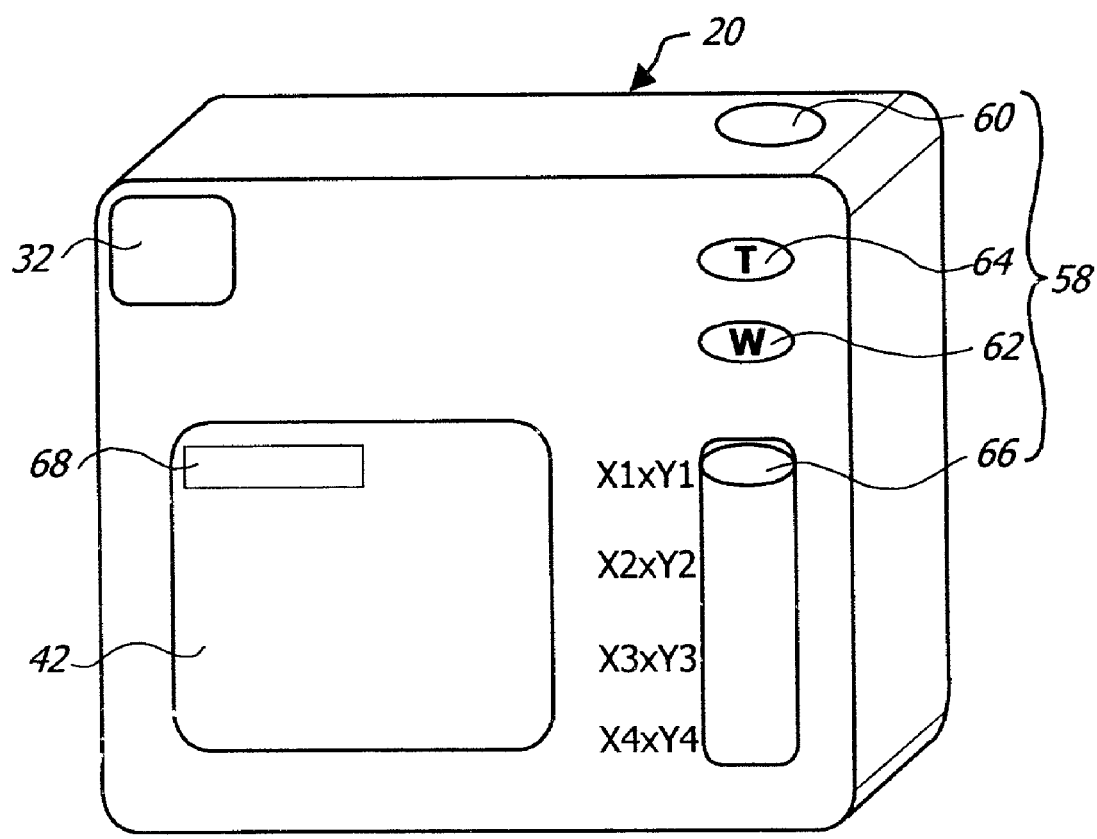
FIG. 2a is a rear view of the camera embodiment of FIG. 1.

An important feature of a verifying hybrid camera or a digital camera is the ability of the camera to show the user a verification image from which the user can determine whether they are satisfied with the captured archival image. The captured archival image can be a latent film image, or a digital image. One important aspect of this determination is whether portions of the captured archival image are out of focus. A verifying camera and method are shown that identify out of focus portions of a captured archival image. The verifying camera provides an original verification image that corresponds to the captured archival image. Out of focus portions of the verification image that correspond to out of focus portions of the archival image are blurred so that the corresponding portions of the verification image will appear out of focus when presented on a display.

Verifying Camera

FIG. 1 shows a block diagram of an embodiment of a verifying camera 20. As is shown in FIG. 1, camera 20 includes a taking lens unit 22, which directs light from a subject (not shown) to form an image on image sensor 24.

The taking lens unit 22 can be simple, such as having a single focal length and manual focusing or a fixed focus, but this is not preferred. In the example embodiment shown in FIG. 1, the taking lens unit 22 is a motorized 2× zoom lens unit in which a mobile element or elements 26 are driven, relative to a stationary element or elements 28 by lens driver 30. An optical viewfinder 32 is coupled to the taking lens unit 22 and enables the user to compose the photograph. Lens driver 30 controls both the lens focal length and the lens focus position.

Auto Focus

Various methods can be used to determine the focus settings of the taking lens unit 22. In a preferred embodiment, the image sensor 24 is used to provide multi-spot autofocus using what is called the "through focus" or "whole way scanning" approach. The scene is divided into a grid of regions or spots, and the optimum focus distance is determined for each image region. The optimum focus distance for each region is determined by moving the camera lens through a range of focus distance positions, from the near focus distance to the infinity position, while capturing images. Depending on the camera design, between 4 and 32 images may need to be captured at different focus distances. Typically, capturing images at 8 different distances provides suitable accuracy.

The captured image data is then analyzed to determine the optimum focus distance for each image region. This analysis begins by band-pass filtering the sensor signal using one or more filters, as described in commonly assigned U.S. Pat. No. 5,874,994 "Filter employing arithmetic operations for an electronic synchronized digital cameras" (Xie et al.), the disclosure of which is herein incorporated by reference. The absolute value of the bandpass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a preferred embodiment, the image regions corresponding to a target object (e.g. a person being photographed) are determined. The focus position is then set to provide the best focus for these image regions, as described in commonly assigned U.S. Pat. No. 5,877,809 "Method Of Automatic Object Detection In An Image", the disclosure of which is herein incorporated by reference. If the target object is moving, object tracking may be performed, as described in commonly assigned U.S. Pat. No. 6,067,114 "Detecting Compositional Change in Image" the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", the disclosure of which is herein incorporated by reference.

In a preferred embodiment, the bandpass filtering and other calculations used to provide autofocus in camera 20 are performed by digital signal processor 40. In this embodiment, camera 20 uses a specially adapted image sensor 24, as is shown in commonly assigned U.S. Pat. No. 5,668,597 "Electronic Camera With Rapid Autofocus Upon An Interline Image Sensor", the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus lens focus unit 22.

In an alternative embodiment, camera 20 uses a separate optical or other type (e.g. ultrasonic) of rangefinder 48 to identify the subject of the image and to select a focus position for taking lens unit 22 that is appropriate for the distance to the subject. The rangefinder 48 operates lens driver 30, directly or by camera microprocessor 50, to move one or more mobile elements 26 of taking lens unit 22. The rangefinder 48 can be passive or active or a combination of the two. A wide variety of suitable multiple sensor rangefinders 48 known to those of skill in the art are suitable for use. For example, U.S. Pat. No. 5,440,369 discloses such a rangefinder 48. A feedback loop is established between lens driver 30 and camera microprocessor 50 so that camera microprocessor 50 can accurately set the focus position of taking lens unit 22. The focus determination provided by the rangefinder 48 can be of the single-spot or multi-spot type. Preferably, the focus determination uses multiple spots. In multi-spot focus determination, the scene is divided into a grid of regions or spots, and the optimum focus distance is determined for each spot.

Archival Image Capture

Image sensor 24 has a discrete number of photosensitive elements arranged in a two-dimensional array. When the analog signal values from each photosensitive element are digitized by the A/D converter 36, they provide the pixel values of the captured digital image. Thus, each individual photosite on image sensor 24 corresponds to one pixel of the captured digital image, referred to herein as an archival image. Image sensor 24 can be either a conventional charge coupled device CCD sensor or a complementary metal oxide semiconductor image sensor. In one example embodiment, image sensor 24 has an array of 1280×960 photosensitive elements. The photosensitive elements, or photosites, of image sensor 24 convert photons of light from the scene into electron charge packets. Each photosite is overlaid with a color filter array, such as the Bayer color filter array described in commonly assigned U.S. Pat. No. 3,971,065, entitled "Color Imaging Array" the disclosure of which is herein incorporated by reference. The Bayer color filter array has 50% green pixels in a checkerboard mosaic, with the remaining pixels alternating between red and blue rows. The photosites respond to the appropriately colored incident light illumination to provide an analog signal corresponding to the intensity of illumination incident on the photosites.

The analog output of each pixel is amplified and analog processed by an analog signal processor 34 to reduce the output amplifier noise of image sensor 24. The output of the analog signal processor 34 is converted to a digital image signal by an analog-to-digital (A/D) converter 36, such as, for example, a 10-bit bit A/D converter which provides an 10 bit signal in the sequence of the Bayer color filter array.

The digitized archival image is temporarily stored in a frame memory 38, and is then processed using a programmable digital signal processor 40 as described in commonly assigned U.S. Pat. No. 5,016,107 entitled "Electronic Still Camera Utilizing Image Compression and Digital Storage"

the disclosure of which is herein incorporated by reference. The image processing includes an interpolation algorithm to reconstruct a fall resolution color image from the color filter array pixel values using, for example, the methods described in commonly assigned U.S. Pat. No. 5,373,322 entitled "Apparatus and Method for Adaptively Interpolating a Full Color Image Utilizing Chrominance Gradients" and U.S. Pat. No. 4,642,678 entitled "Signal Processing Method and Apparatus for Producing Interpolated Chrominance Values in a Sampled Color Image Signal", the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

After this processing is complete, the archival image is JPEG compressed, and stored in a data memory 44. The JPEG compression uses the well-known discrete cosine transform to transform 8×8 blocks of luminance and chrominance signals into the spatial frequency domain. These discrete cosine transform coefficients are then quantized and entropy coded to produce JPEG compressed image data. This JPEG compressed image data is stored using the so-called "Exif" image format defined in "Digital Still Camera Image File Format (Exif)" version 2.1, July 1998 by the Japan Electronics Industries Development Association Tokyo, Japan. The Exif format archival image can also be stored in a memory card 52. In the embodiment of FIG. 1, camera 20 is shown having a memory card slot 54 which holds a removable memory card 52 and has a memory card interface 56 for communicating with memory card 52. The Exif format archival image can also be transmitted to a host computer (not shown), which is connected to camera 20 through a host computer interface 46.

Forming and Displaying a Verification Image

The signal processor 40 also creates a smaller size digital image for display on image display 42. This image is referred to herein as a verification image. Display 42 can comprise, for example, a color liquid crystal display (LCD), organic light emitting display, or other type of video display. The verification image is preferably created and displayed immediately after the archival image is captured, and can be created as described in commonly assigned U.S. Pat. No. 5,164,831 "Electronic Still Camera Providing Multi-Format Storage Of Full And Reduced Resolution Images" the disclosure of which is herein incorporated by reference. This verification image is stored in data memory 44 and supplied to display 42, which displays the smaller sized, processed verification image for the user to review.

The camera 20 is controlled by user controls 58, some of which are shown in more detail in FIG. 2a. The user controls 58 include a shutter release 60 which initiates a picture taking operation, along with a "wide" zoom lens button 62 and a "tele" zoom lens button 64, which together control both a 2:1 optical zoom and a 2:1 digital zoom feature. The optical zoom is provided by taking lens unit 22, and adjusts the magnification in order to change the field of view of the focal plane image captured by the image sensor 24. The digital zoom is provided by the signal processor 40, which crops and resamples the captured image stored in the frame memory 38. When the user first turns on the camera 20, the zoom lens is set to the 1:1 position, so that all sensor photoelements are used to provide the captured image, and the taking lens unit 22 is set to the wide angle position. In a preferred embodiment, this wide angle position is equivalent to a 40 mm lens on a 35 mm film camera. This corresponds to the maximum wide angle position.

When the user then depresses the "tele" zoom lens button 64, the taking lens unit 22 is adjusted by the camera microprocessor 50 via the lens driver 30 to move the taking lens unit 30 towards a more telephoto focal length. If the user continues to depress the "tele" button 64, the taking lens unit 22 will move to the full optical 2:1 zoom position. In a preferred embodiment, this full telephoto position is equivalent to a 40 mm lens on a 35 mm film camera. If the user continues to depress the "tele" button 64, the taking lens unit 22 will remain in the full optical 2:1 zoom position, and digital signal processor 40 will begin to provide digital zoom, by cropping (and optionally resampling) a central area of the image. While this increases the apparent magnification of the camera, it causes a decrease in sharpness, since some of the outer photoelements of the sensor are discarded when producing the archival image. However, this decrease in sharpness would normally not be visible on the relatively small display 42.

In the camera 20 of FIG. 1, the captured image is derived from a high resolution image sensor 24, having for example 1280×960 photosites, corresponding to about 1.25 megapixels. The term resolution is used herein to indicate the number of picture elements used to represent the image. Display 42, however, has lower resolution providing for example 320× 240 elements, which correspond to about 0.08 megapixels. Thus, there are 16 times more sensor elements than display elements. Accordingly, it is necessary to resample the archival image into a verification image having a suitably small image size so that it can properly fit on display 42. This resampling can be done by using low pass filtering, followed by sub-sampling, or by using bilinear interpolation techniques with appropriate anti-aliasing conditioning. Other techniques known in the art for adapting a high resolution image for display on a relatively low display can alternatively be used.

The resampling of the captured image to produce a verification image having fewer pixels (i.e. lower resolution) than the captured image is performed by digital signal processor 40. As noted earlier, the signal processor 40 also provides digital zooming. In the maximum 2:1 setting, the signal processor 40 uses the central 640×480 sensor area to provide the archival image by interpolating this central area up to 1280×960 samples.

The signal processor 40 can also modify the archival image in other ways so that the verification image matches the appearance of the archival image. These include color calibrating the verification image so that when the verification image is presented on the display, the displayed colors of the verification image appear to match the colors in the archival image. These and other modifications help to provide the user with an accurate representation of the color, format, scene content and lighting conditions in the archival image.

However, as noted above, because the verification image is displayed using an electronic display that has lower resolution than the archival image, the verification image may appear to be sharper when viewed through the verification display than it will appear when the archival image is printed or otherwise displayed at higher resolution. Thus, areas that are out of focus in the archival image could appear to be in focus when viewed on the display. Moreover, when the digital zoom is active, the entire image is softened, but this softening would normally not be visible in display 42. For the example digital camera of FIG. 1, since the display is 320×240 pixels while the archival image is provided using a sensor area of 640×480 pixels in the maximum digital zoom setting, the image displayed on display 42 after normal resizing will appear suitably sharp. However, the archival image will not produce an acceptably sharp print. Therefore, the present invention uses a resampling technique which creates a verification image having 320×240 pixels, but having reduced apparent sharpness when the maximum digital zoom setting is used.

It will be appreciated, that the apparent sharpness of a print or other tangible output that is made from the archival image is also a function of the size of the rendered image. For example, an archival image having a resolution of 1280×960 pixels is capable of providing a suitably sharp image when printed at a size of between 3×5 inches, or 4×6 inches. However, if the same image is rendered in a size of 8×10 inches, portions of the verification image that would appear to be in focus at a lower rendered output size such as 3×5 inches may appear to be blurred. Thus, as is shown in FIG. 2a, camera 20 has input 66 for identifying a proposed image output size. In the embodiment which is shown, input 66 comprises a slide switch with variable settings between a relatively small rendered output size represented by the X1×Y1 position, and a relatively large rendered output size represented by the X4×Y4 position. In this way, the user of camera 20 has the ability to, while at the site of the photographic scene, identify the anticipated size of the rendered output so that the verification image can be displayed in a manner which reveals potential out of focus areas in the image as it will be finally rendered. Accordingly, the photographer has the opportunity to capture another image of the scene so that the rendered image will have the desired focus levels. It will be understood that input 66 can comprise other input devices such as rotary switches, and menu driven and mouse driven inputs known to those in the art.

In addition to the blurring of the image, the user of camera 20 can also be warned about potential focus problems using supplemental warnings. In one embodiment, the displayed verification image is overlaid with an icon or text message 68. Examples of possible icon and text messages 29 that can be used for this purpose are shown in FIGS. 2b–2j. These messages can be used to further indicate that the image quality has been reduced as a result of the digital zooming operation as shown in FIGS. 2b and 2c or the anticipated rendered output size, as shown in FIG. 2d. The icon or text message can optionally identify zoom settings and/or the anticipated rendered image size, e.g. FIG. 2d. The icons can also be simplified to provide a general warning of reduced resolution that will occur as a result of camera settings. Examples of general icons that can be used for this purpose are shown in FIGS. 2e–2g, and in FIGS. 2h–2j which respectively show icons indicating high resolution, good resolution and reduced resolution.

In camera 20 of FIG. 1, an archival image is typically captured using image sensor 24 when the user depresses the shutter release 60. In response, a capture sequence is then initiated by camera microprocessor 50 signaling a timing generator 70. The timing generator 70 is connected generally to the elements of camera 20, as shown in FIG. 1, for controlling the digital conversion, compression, and storage of the image signal. The image sensor 24 is driven from the timing generator 70 via a sensor driver 71 to produce the image signal provided to analog signal processor 34.

Figure 3A:
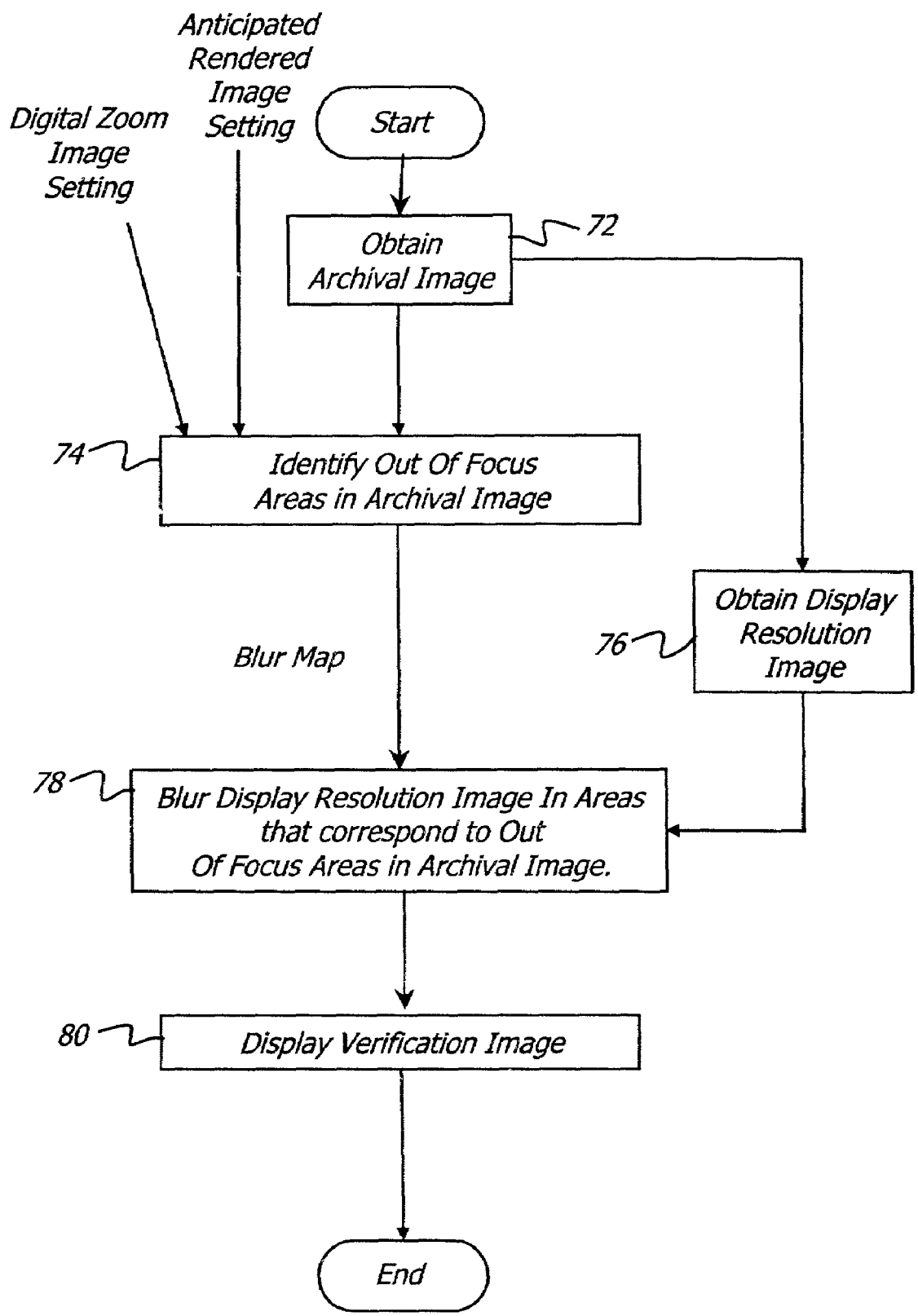
FIG. 3a is a flow diagram in block form showing the method of an embodiment of the present invention.

FIG. 3a shows a flow diagram depicting a first embodiment of the method of the present invention. This method can be performed by the digital signal processor 40 in camera 20. As is shown, an archival image is obtained (block 72). Typically, this step will be accomplished by image capture using image sensor 24 as described above. The captured archival image is processed as described earlier and resampled to provide the appropriate digital zoom level. However, the archival image may also be obtained from a memory such as memory 38 and memory card 52 or other memory device (not shown) through host computer interface 46.

The areas of the archival image that are out of focus are then identified (block 74) in a "blur map" that is created in a manner that will be described later. The archival image is resampled in order to provide a display resolution verification image (block 46). If the digital zoom setting is 1:1 (e.g. no resampling), a normal level of low pass filtering, to minimize aliasing, is provided before resampling. However, as the digital zoom level or anticipated rendered image size increases, the low pass filtering provided prior to resampling is modified to provide more blurring, so that the verification image includes appropriate blurring. The particular areas of the display resolution image which have been identified, via the blur map, as out of focus areas in the archival image are then blurred (block 78). In block 78, digital signal processor 40 further low pass filters the display resolution image, so that the portions of the verification image that correspond to the portions of the archival image identified by the blur map as out of focus, appear out of focus when the verification image is displayed on display 42 (block 80). If the digital zoom setting is 1:1, only those portions of the verification image identified by the blur map will appear out of focus when the verification image is displayed on display 42.

Figure 3B:
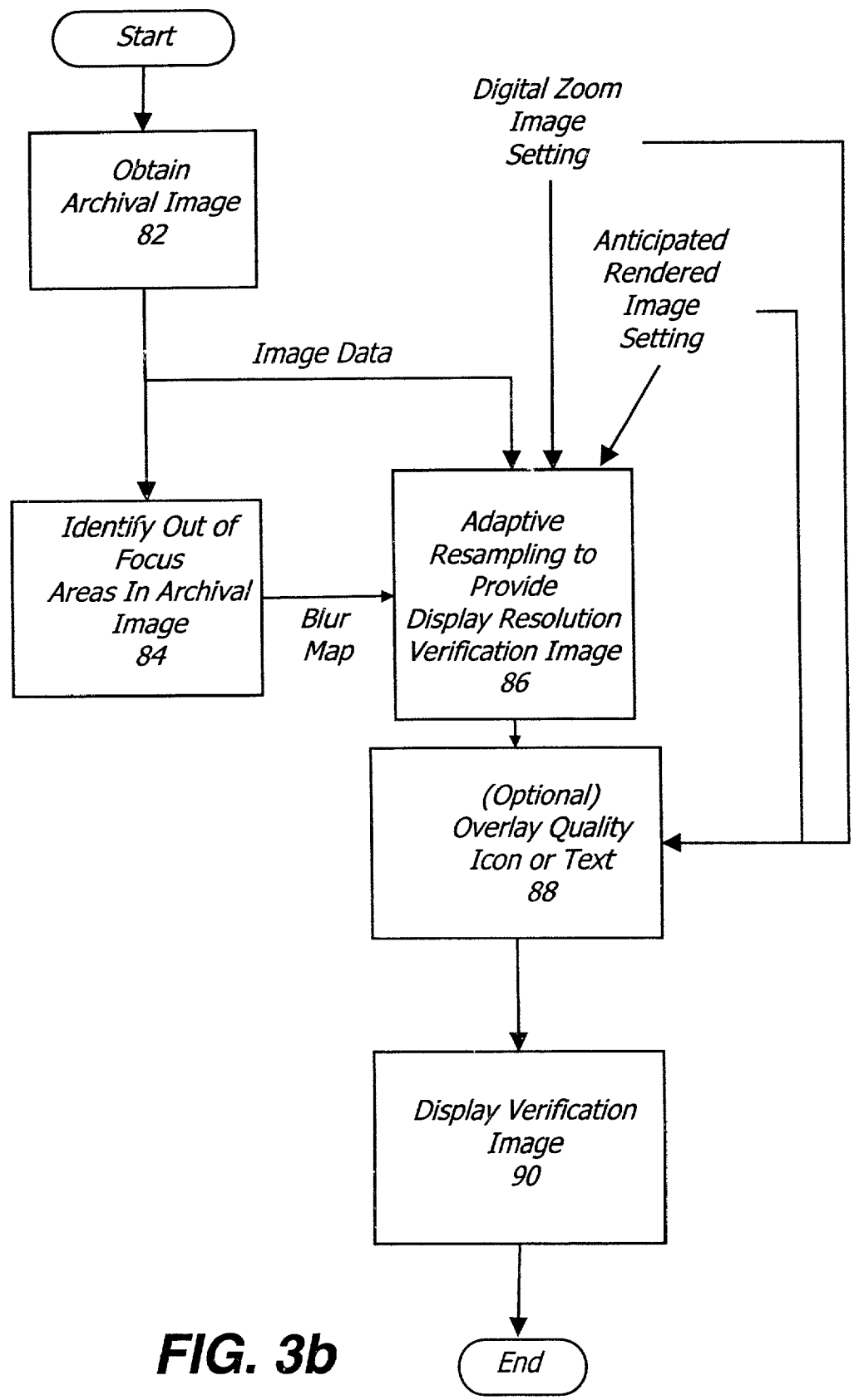
FIG. 3b is a flow diagram in block form showing the method of an embodiment of the present invention.

FIG. 3b shows a flow diagram depicting a second embodiment of the method of the present invention. As described in relation to FIG. 3a, an archival image is obtained (block 82), and the areas of the archival image that are out of focus are then identified (block 84) by providing a blur map. The archival image is adaptively resampled in order to provide a verification image (block 86). The adaptive resampling provides a variable level of low pass filtering, which is a function of both the digital zoom setting and the blur map values. As the digital zoom level increases, or the blur map values increase, and the low pass filtering provided prior to resampling is modified to provide more blurring, so that this particular region of the verification image includes significant blurring. Optionally, the display resolution image is then overlaid with an icon or text message 68 indicating that the image quality is not at the peak level, when significant levels of digital zoom are used in capturing the archival image (block 88). The verification image is then presented on display 42 (block 90).

Figure 4:
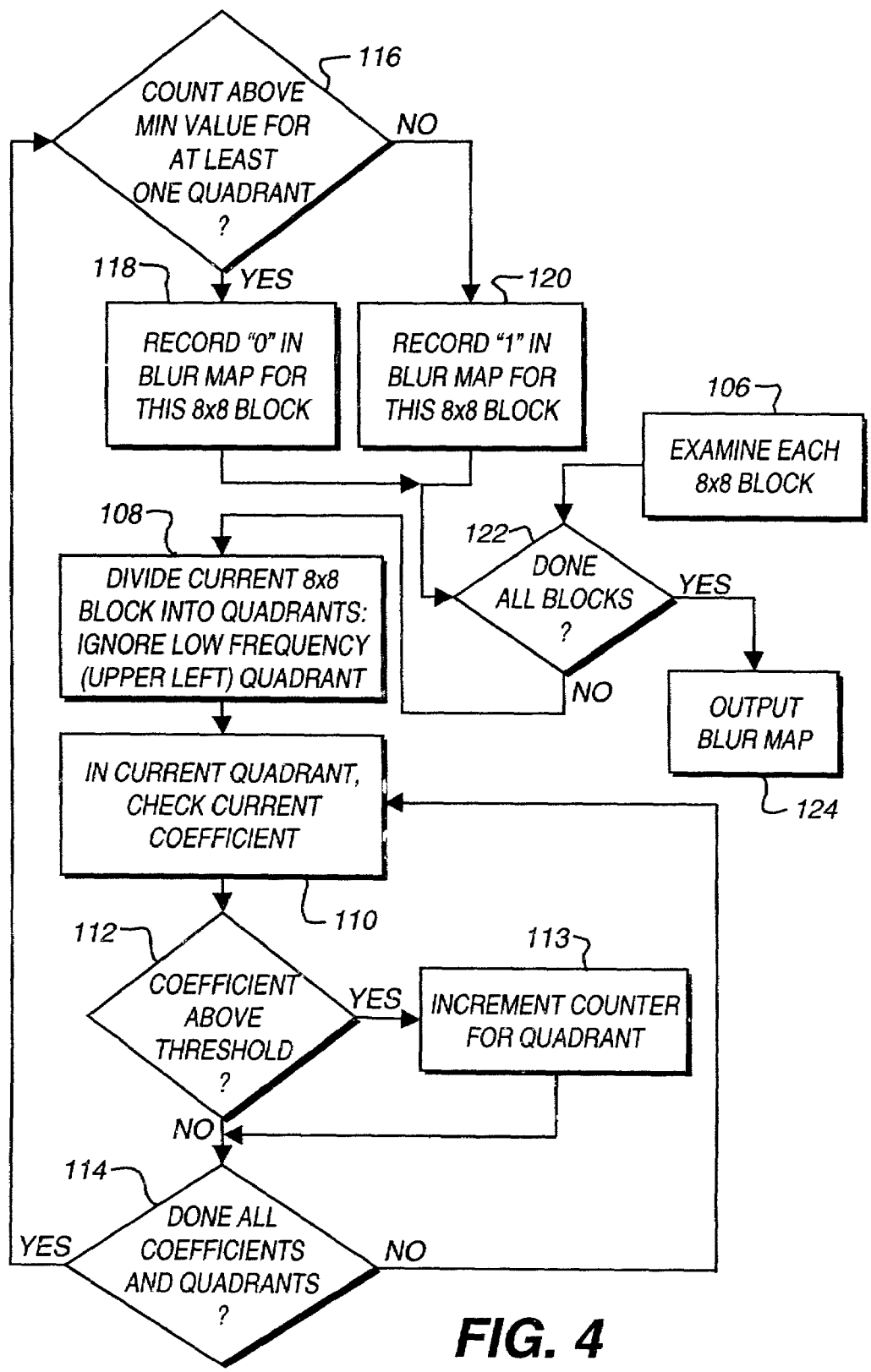
FIG. 4 is a flow diagram in block form showing a detailed embodiment of the method of the first embodiment of the present invention.

Turning now to FIG. 4, what is shown is a detailed flow diagram of a first embodiment of a method for forming a blur map that identifies out of focus portions of the archival image. This method can be used in conjunction with either of the embodiments of FIG. 3a or 3b. (block 74 and block 84 respectively) As shown, the compressed luminance data is extracted from the JPEG compressed image data generated by the signal processor 50 when the archival image is captured (block 102). In the JPEG format, the image was separated into 8×8 pixel blocks. Each of these blocks was transformed into an 8×8 frequency-space representation using a discrete cosine transform, with each block containing one DC value and 63 AC coefficients.

The AC coefficients in the luminance channel are extracted and used to produce the blur map. Each 8×8 block of AC coefficients in the luminance channel is examined separately (block 106).

Figure 5:
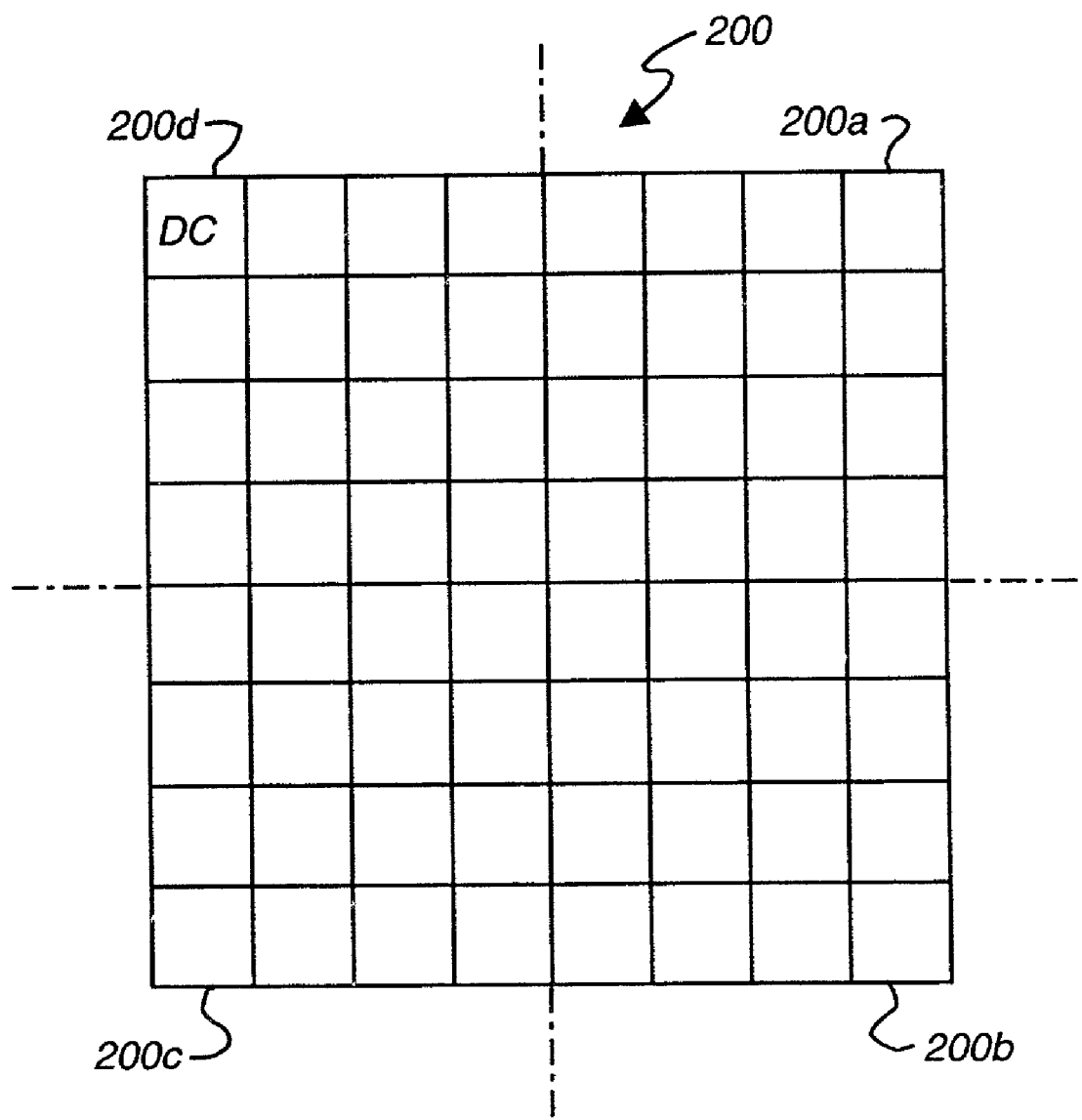
FIG. 5 is a diagram showing the four quadrants of an 8×8 block of AC coefficients of a processed digital image produced in FIGS. 3a and 3b that are used to create an edgemap.

To create the blur map, each 8×8 block of AC coefficients in the luminance channel is divided into four quadrants (block 108), as shown in FIG. 5. The upper right quadrant 200a contains the high horizontal frequencies, the lower right quadrant 200b contains the high horizontal and high vertical frequencies, the lower left quadrant 200c contains the high vertical frequencies, and the upper left quadrant 200d contains the low horizontal and low vertical frequencies. Only the three quadrants 200a, 200b, and 200c containing the high frequencies (i.e., the upper right, lower right, and lower left quadrants) are examined for edges and details (block 110 in FIG. 4).

The lower right quadrant 200b containing the high horizontal and high vertical frequencies is examined first. A count is made of the number of coefficients which have a magnitude above a predetermined threshold value (blocks 112 and 113). Preferably, a threshold value between 5 and 10 discrete cosine transform code values is used to capture sharp details without including substantial image noise. If at least 25 percent of these coefficients are above the threshold value, then the desired sharpness condition for this quadrant 200b has been met.

The upper right quadrant 200a contains the high horizontal frequencies. This quadrant is examined in a similar fashion to detect vertical edges which contain a large band of frequencies. If at least 50 percent of the coefficients are above the threshold value, then the desired sharpness condition has been met for this quadrant 200a.

The lower left quadrant 200c containing the high vertical frequencies is then examined to detect horizontal edges. If at least 50 percent of the coefficients are above the threshold value, then the desired sharpness condition has been met for this quadrant 200c.

Once the three high frequency quadrants 200a, 200b, and 200c have been examined (block 114), it is determined if the desired sharpness condition has been met for at least one of the three examined quadrants (block 116). If the desired sharpness condition has been met for at least one of the three examined quadrants, then the entire discrete cosine transform block 200 of AC coefficients is designated as containing sharp detail and being "in-focus," and the corresponding pixel in the blur map is turned "off" (block 118). If none of the three examined quadrants satisfies the desired sharpness condition, then the entire 8×8 discrete cosine transform block 200 is designated as being "blurred" and the corresponding pixel in the blur map is turned "on" (block 120).

This process is continued for all discrete cosine transform blocks 200 in the image. Once the blur map is completely defined for all discrete cosine transform blocks 200 (block 122), the blur map is output (block 124) to identify out of focus areas in the archival image. Though not shown in FIG. 4, prior to outputting the blur map in block 124, the data from block 122 may be filtered or manipulated to smooth the blur map data. For example, only larger regions of in-focus image data might be detected, rather than small areas of localized detail, in order to minimize the effects of noise. This is accomplished by filtering out the blur map pixels which are "on" (or "off") but have no neighboring "on" (or "off") pixels. Morphological filtering can also be performed on the blur map, including opening or closing, to eliminate stray "on" and "off" pixels and to smooth the blur map data.

In the example camera 20 of FIG. 1, the image sensor 24 has 1280×960 photosites, while display 42 has 320×240 display elements. Since there is one discrete cosine transform block for each 8×8 block of luminance pixels in the archival image, the blur map provided in blocks 74 or 84 is a 500×120 array, when the digital zoom is set to 1:1. As a result, each blur map value is used to determine whether or not to blur the corresponding 2×2 pixel area of the display resolution image, in block 78 of FIG. 3a or block 86 of FIG. 3b. It will be understood that when there is a different relationship between the number of pixels in the archival image and the number of pixels in the display resolution image, each blur map array value could correspond to a different area in the display resolution image. For example, when the archival image is captured using the 2:1 digital zoom setting (without resampling to create a larger image file) there are 640×480 pixels in the archival image. In this case, there are 80×60 elements in the blur map array, so that each blur map value corresponds to a 4×4 pixel area of the display resolution image.

It will be appreciated that the process depicted in FIG. 4 can be repeated using multiple thresholds. This will create a set of complementary blur maps. These complementary blur maps can be used, for example, to separate regions of the archival image that are substantially out of focus from regions of the archival image that are only modestly out of focus. Conventional set theory techniques can be used to perform this technique.

The blur map provided by the process depicted in FIG. 4 is used as the basis for modifying the display resolution image in block 78 of FIG. 3a, so that areas which will be blurred in the archival image (e.g. when the archival image is printed on a high quality printer) appear to be blurred when the verification image is presented on display 42 in block 80 of FIG. 3a.

In one embodiment of block 78 in FIG. 3a, this blur is created by defining subdivisions within each of the identified out of focus areas of the verification image. The color and luminous intensity of each pixel within each subdivision is then averaged. This creates a blur effect within each subdivision. This blur effect becomes more pronounced in when the subdivisions are made larger. For example, the subdivisions can be 2×2 pixel areas, corresponding to the blur map size when the 1:1 digital zoom setting is used. When the blur map value equals 0, indicating an in-focus region, the normally filtered, resampled values for the corresponding pixels output from block 76 are used. When the blur map equals 1, indicating an out-of-focus region, the values from the 2×2 pixels are averaged and used for all 4 display pixels for this particular region.

These subdivisions are defined to have a size that is at least large enough so that when the smallest sized subdivisions are averaged a blur is evident on the display.

Further, it is possible to vary the subdivision sizes in order to create a verification image having areas that are appear to be more or less out of focus. Where larger subdivision sizes are used (e.g. 3×3 pixels, 4×4 pixels, etc), the displayed verification image will appear to be more out of focus. Similarly, where smaller subdivision sizes are used, the displayed verification image will appear to be less out of focus. Advantageously, the size of the subdivision can be associated with different blur map values, so that more out of focus regions of the archival image can be represented in the verification image by areas that appear to be more out of focus, while less out of focus regions of the archival image can be represented in the verification image by areas that are less out of focus.

In an alternative embodiment of block 78 of FIG. 3a, the blurring is accomplished by using a blur kernel to blur those pixels of the display resolution image that correspond to areas of the blur map which are not equal to 0. An example of such a blur kernel is:

$$\frac{1}{16}\begin{pmatrix} 1 & 2 & 1 \\ 2 & 4 & 2 \\ 1 & 2 & 1 \end{pmatrix}.$$

Different blur kernels can be used to provide a greater or lesser degree of blur in the image. In this regard, different blur kernels creating different degrees of blur can used to distinguish areas of an archival image that are out of focus to a different extent. However, for each blur kernel, the extent of the blur should be sufficiently large so as to be visible when displayed on display 42.

In order to define sub-divisions, blur kernel characteristics to ensure that the introduced blur is evident to a consumer, it is possible to manually calibrate the degree to which blur is introduced into the image by optical visual testing in which various sub-division sizes and/or blur kernels are applied to portions of an image. Only those kernels that create a recognizable visual response are used. Where it is desired to apply multiple blur levels to an image, optical testing can associate various sub-division sizes and/or various blur kernels with various degrees of detected out of focus in the archival image.

In accordance with another embodiment of the present invention, the extent of blur required by the product can be determined empirically. This is done using the contrast sensitive function (CSF) which describes the human visual system's spatial frequency response (SFR) to spatial detail. This CSF can be determined using the following model:

$$A(f) = 2.6(0.0192 + 0.114f)e^{-(0.114f)^{1.1}}$$

where A is the CSF (a unitless value) and the spatial frequency (f) is in units of cycles/degree. This relationship can be applied, for example, to an image (FIG. 3c) that is two inches wide and one and a half inches tall comprising 128 horizontal pixels and 96 vertical pixels which is viewed at an anticipated distance of 15 inches. Therefore, 1 cycle/degree at the viewer corresponds to approximately 0.06 cycles per sample on this display, at this viewing distance. According to the CSF model, to blur the displayed image, it is necessary to higher spatial frequencies at which the human visual system is more This occurs when the CSF reaches an SFR of 0.5, which occurs around 0.12 cycles per sample. By attenuating or truncating higher spatial frequencies in at a range of about 0.08 to 0.5 cycles per sample, corresponding to 1.3 to 8.4 cycles per degree, a visual blur can be induced in the displayed image. It appreciated that this range can vary as the anticipated distance from the view to the display changes. Using the dimensions identified above, it is to develop a blur kernel to induce such a blur. A blur kernel of this type below.

$$\frac{1}{176}\begin{pmatrix} 1 & 2 & 2 & 2 & 2 & 2 & 2 & 2 & 1 \\ 2 & 2 & 2 & 2 & 4 & 2 & 2 & 2 & 2 \\ 2 & 2 & 2 & 2 & 2 & 2 & 2 & 2 & 2 \\ 2 & 2 & 2 & 2 & 4 & 2 & 2 & 2 & 2 \\ 2 & 4 & 2 & 4 & 4 & 4 & 2 & 4 & 2 \\ 2 & 2 & 2 & 2 & 4 & 2 & 2 & 2 & 2 \\ 2 & 2 & 2 & 2 & 2 & 2 & 2 & 2 & 2 \\ 2 & 2 & 2 & 2 & 4 & 2 & 2 & 2 & 2 \\ 1 & 2 & 2 & 2 & 2 & 2 & 2 & 2 & 1 \end{pmatrix}$$

Figure 3C:
FIG. 3c shows an example verification image.
Figure 3D:
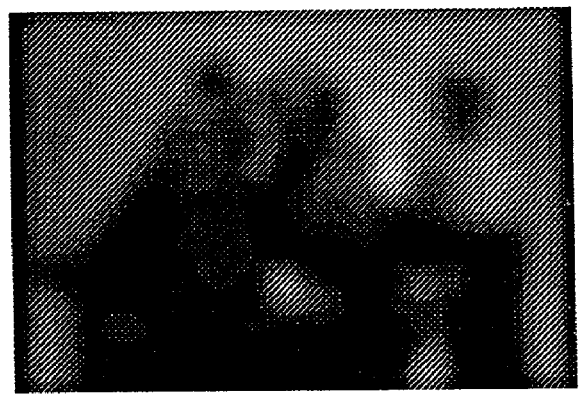
FIG. 3d shows the effect of applying one embodiment of the blur kernel to the image of FIG. 3c.
Figure 3E:
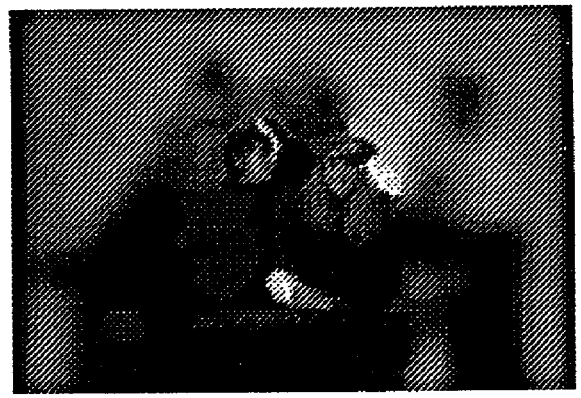
FIG. 3e shows the effect of applying one embodiment of a blur kernel to portions of the verification image that correspond to out of focus portions of an archival image.

FIG. 3d shows the effect of applying this blur kernel to the entire image of FIG. 3c. FIG. 3e shows the application of the blur kernel to out of focus areas. It will be appreciated that more than one blur kernel can be used with each blur kernel having an empirically determined blur setting necessary to cause a variable degree of apparent blur in the image.

Figure 6:
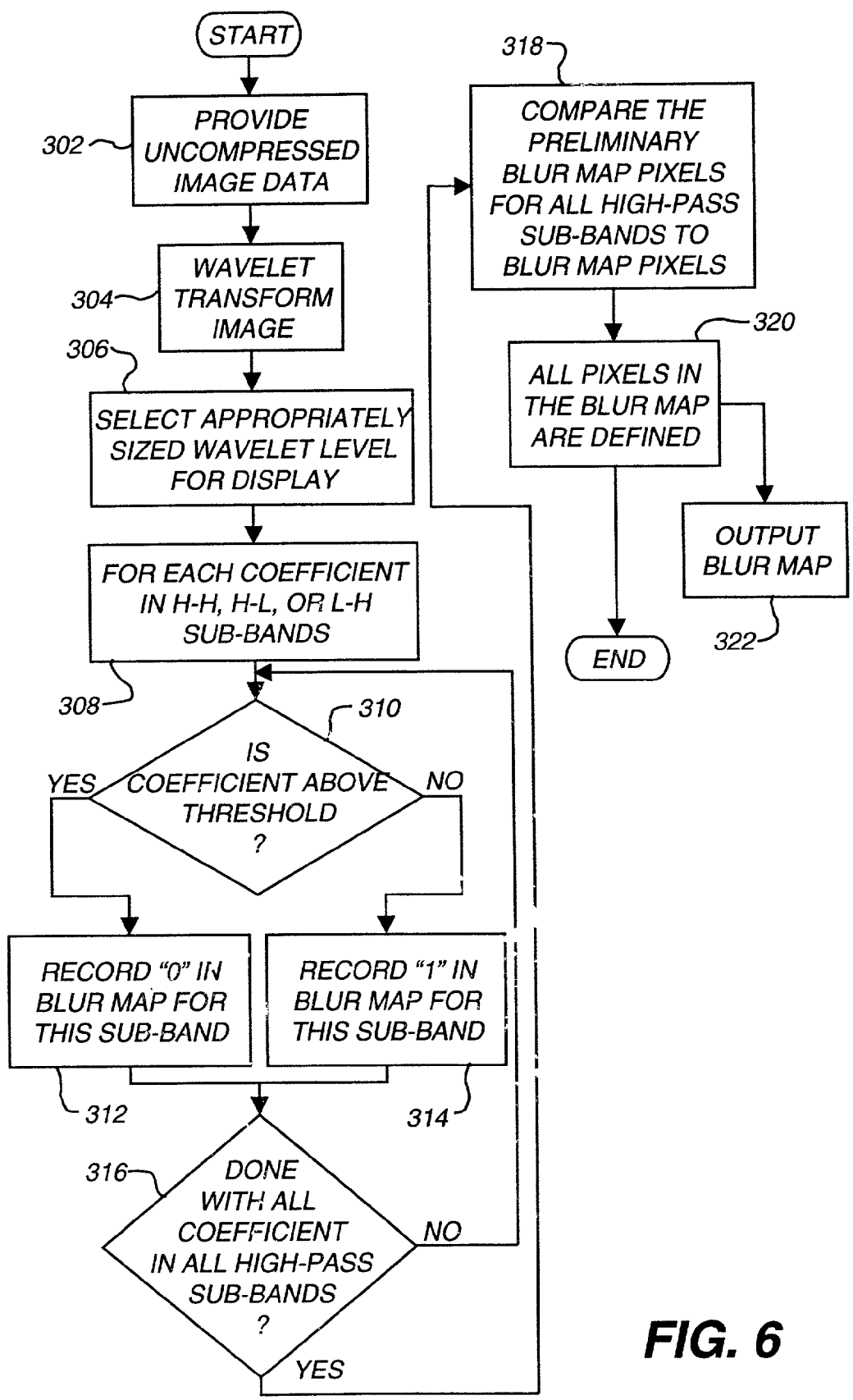
FIG. 6 shows another detailed embodiment of the method of the present invention.

Turning now to FIG. 6, a flow diagram of another embodiment of a method for identifying out of focus areas in an archival image that can be used to perform block 74 of the method of FIG. 3a or block 84 of the method of FIG. 3b is shown. In this embodiment, uncompressed image data is provided (block 302) either directly during the archival image processing, or by decompressing the JPEG compressed Exif image file. The blur map is then produced by encoding the processed image using a wavelet compression algorithm (block 304), which transforms the image in the frequency domain. For a detailed description of wavelet transforms, see S. G. Mallat, "A Theory For Multiresolution Signal Decomposition: The Wavelet Representation," IEEE Transactions On Pattern Analysis And Machine Intelligence, Volume II, Issue 7, 1989, pages 674–693. See also, J. M. Shapiro, "Embedded Image Coding Using Zerotrees Of Wavelet Coefficients," IEEE Transactions On Signal Processing, Volume 41, December 1993, pages 3345–3346, for a description of implementation of a wavelet image compressor.

In general, it is known that with wavelet compression, an image is encoded in a hierarchical fashion by passing the rows and columns of pixels through a low-pass filter and a high-pass filter. After filtering, the image is decimated to remove any redundant information, for example, by removing every other row or column of pixels. This process results in the image being divided into four sub-bands, each of which has one fourth as many pixels as the original image (i.e., the resolution of the image is reduced by two times vertically and horizontally). The four sub-bands, when taken together, form an image the same size as the original image. In addition, the filtering process results in wavelet coefficients for each sub-band so that there is a wavelet coefficient associated with a plurality of pixels in the original image. Thus, the wavelet coefficients are a spatially-correlated frequency domain representation of the original image.

Figure 7:
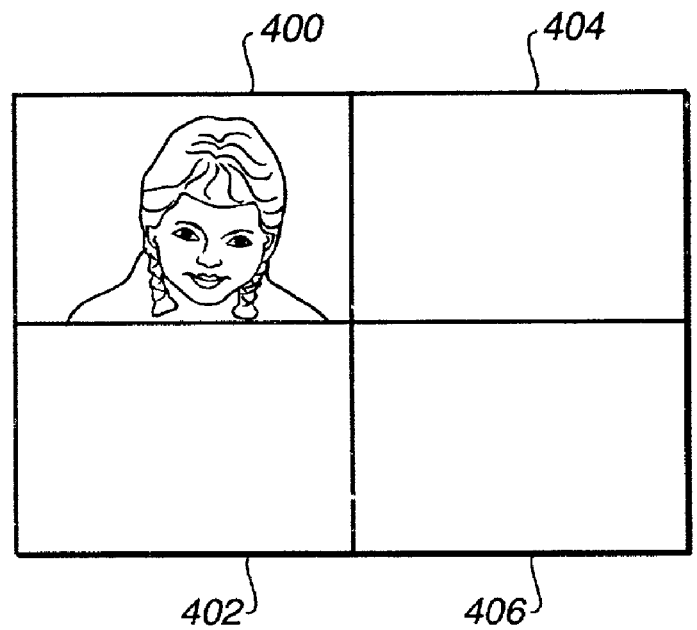
FIG. 7 shows four sub-bands resulting from a one-level wavelet transform.

FIG. 7 shows the four sub-bands resulting from a one-level wavelet transform. The upper left sub-band 400 has had both the rows and columns of pixels passed through a low pass filter. The lower left sub-band 402 has had the rows filtered by a low-pass filter and the columns filtered by a high-pass filter. The upper right sub-band 404 has had the columns filtered by a low-pass filter and the rows filtered by a high-pass filter. The lower right sub-band 406 has had both the rows and columns filtered by a high-pass filter. Further resolution levels of the wavelet transform can be produced by starting with the upper left sub-band 400 from the previous resolution level that has had both its rows and columns filtered by a low-pass filter, and repeating the entire process. The result of a two-level wavelet transform is shown in FIG. 7, in which the upper left sub-band 400 has been further transformed into four smaller sub-bands.

Figure 8:
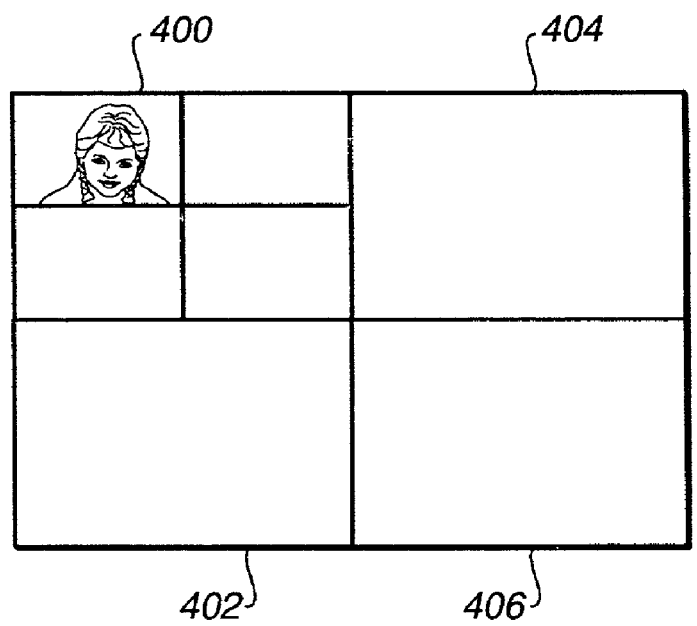
FIG. 8 shows a two level wavelet transform in which at least one sub-band is further transformed into four smaller sub-bands.

To create the blur map, an appropriately sized wavelet transform level is chosen in accordance with the resolution of the verification image display (block 306). For any particular hierarchical level, the three high-pass sub-bands 402, 404, and 406 shown in FIG. 8 can be used to provide edge information since the high-pass filtering should remove all blurry areas of the image and pass through only sharp edges and detail. To create the blur map, each of the three high-pass sub-bands 402, 404, and 406 is examined separately for edges and detail (block 308). For each high-pass sub-band, a preliminary blur map is created by comparing the magnitude of each wavelet coefficient against a predetermined threshold value (block 310). Wavelet coefficients having magnitudes above the threshold value are designated as being in-focus, and the corresponding preliminary blur map pixels are turned "off," i.e., a binary value of "0" is recorded (block 312). Those wavelet coefficients having magnitudes below the threshold value are designated as being out-of-focus, and the corresponding preliminary blur map pixels are turned "on," i.e., a binary value of "1" is recorded (block 314).

Once the preliminary blur map pixels are defined for all wavelet coefficients in the three high-pass sub-bands 402, 404, and 406 (block 316), the corresponding preliminary blur map pixels for each of the three high-pass sub-bands are compared to determined if at least one of the three corresponding preliminary blur map p pixels has been turned "off" (block 318). If at least one of the three corresponding preliminary blur map pixels has been turned "off," then the image pixel is designated as containing sharp detail and being "in-focus," and the corresponding blur map pixel is also turned "off." If none of the three corresponding preliminary blur map pixels has been turned "off" that is, if all corresponding preliminary blur map pixels for the three high-pass sub-bands has been recorded as "1," then the image pixel is designated as being "blurred," and the corresponding blur map pixel is turned "on."

Once all of the pixels in the blur map have been defined (block 320), the blur map can be output (block 322) and used in block 78 of FIG. 3a, or block 86 of FIG. 3b.

It will be appreciated that in many digital cameras, the JPEG DCT or wavelet transform is already used for compression purposes. Therefore, the transform domain luminance values are already available, and can be used as described relative to FIGS. 3–7 to produce the blur map.

Figure 9A:
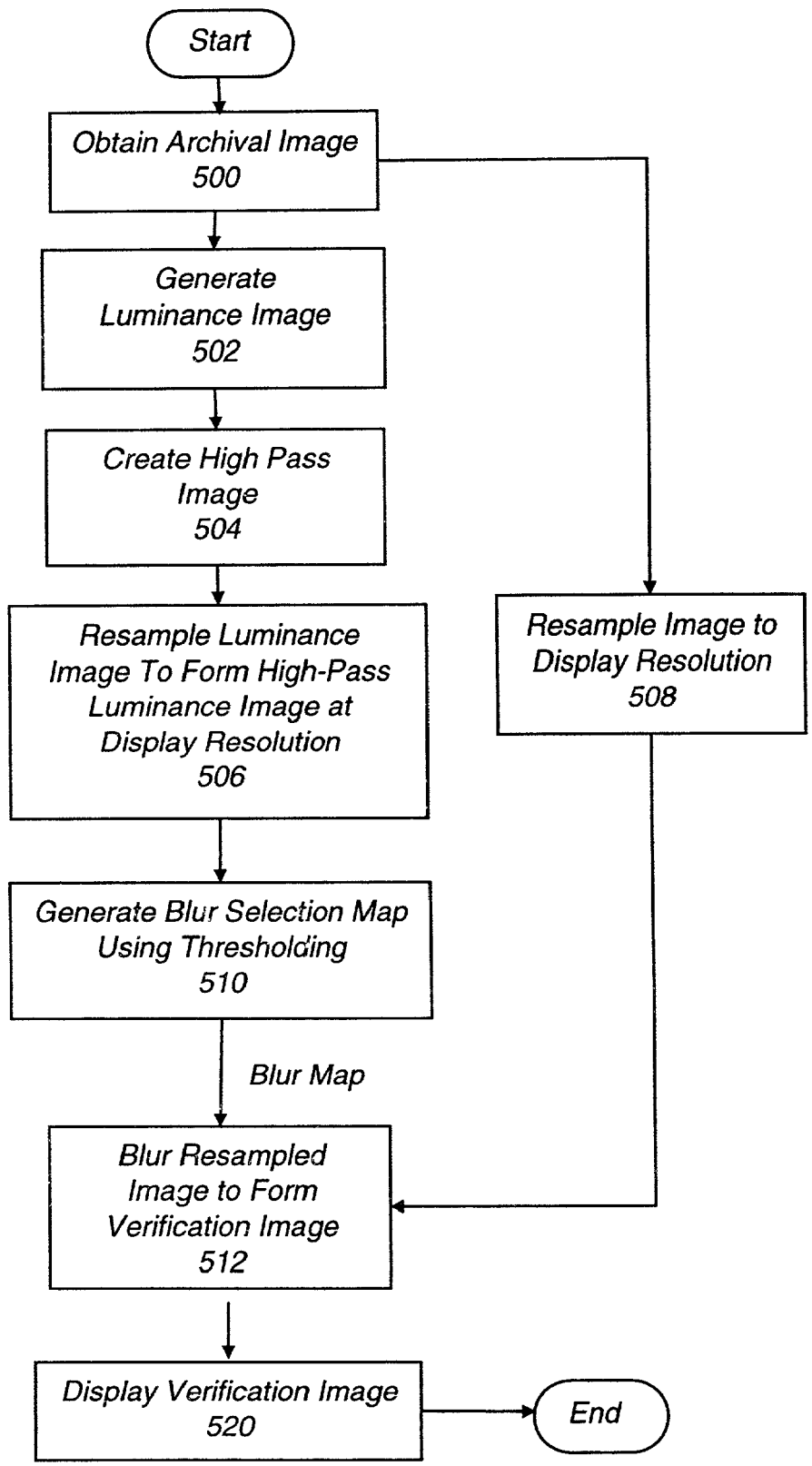
FIG. 9a is a flow diagram in block form showing another embodiment of the present invention.

FIG. 9a shows another alternative embodiment of a method for identifying those portions of an archival image that are out of focus and for blurring the verification image in the out of focus areas. In this embodiment, an archival image is first obtained (block 500). The archival image is processed to create a luminance image using a standard luminance matrix equation, such as $$Y=0.30R+0.59G+0.11B$$

Where Y is the luminance value, and RGB are the red, green, and blue signal values (block 502). This luminance image is then passed through a high-pass spatial frequency filter in order to create a high-pass luminance image (block 504). A typical finite impulse response (FIR) high-pass filter that could be used takes the form of the following filter kernel:

$$\begin{pmatrix} 0 & -1 & 0 \\ -1 & 4 & -1 \\ 0 & -1 & 0 \end{pmatrix}$$

The effectiveness of this step can be adjusted using different high-pass filters. The effectiveness of this step can also be adjusted by the use information that is known about the optical settings of the taking lens unit 22 in camera 20. For example, for a given camera 20 the focal length of the lens, the depth of field of the image sensor and the focussed distance at the time that the archival image is captured can be determined. Where such information about the archival imaging system is known, it can be used to modify the high pass filter to improve upon the imaging characteristics. Alternatively, such information can be used to select preferred high pass filters from a bank of high pass filters.

The filtered luminance image is then resampled to match the resolution of display 42 (block 506). This can be done by sub-sampling or bilinear interpolation techniques with appropriate anti-aliasing conditioning as is known in the art. For the example in camera 20 of FIG. 1, the high pass filtered luminance image can be resampled to convert the 1280×960 pixel archival image (when the 1:1 digital zoom setting is used) to the 320×240 display resolution image by selecting the absolute value of the maximum high pass luminance image value within each 4×4 pixel area. A blur selection map is then generated (block 510). This can be done by applying a threshold test to the display-resolution high pass image. The threshold can be a predetermined value. The threshold can also be dynamically determined by creating a histogram of the display resolution high-pass image and determining a threshold value that identifies a predetermined percentage of the image data as being out of focus. Typically, high-pass values that are small in an absolute sense are considered indicative of out of focus areas in an archival image. The thresholding technique is used to separate such small values from larger values that are indicative of in-focus areas of the image. Using such thresholding, a blur image is formed to match a verification image. By applying multiple thresholds to an image, a set of complimentary blur images can be formed. This set of complimentary blur images can be used to discriminate between regions of the archival image that are substantially out of focus, and portions of the archival image that are only modestly out of focus.

In the embodiment of FIG. 9a, the archival image is resampled to provide a display resolution verification image, as described earlier in relation to block 76 of FIG. 3a. Though not shown in FIG. 9a, the digital zoom factor and anticipated rendered image size can also be used as an additional input in setting the blur level, as described earlier in relation to FIG. 3a.

The blur selection map provided in block 510 is matched to the display resolution image, so that out of focus regions of the display resolution verification image can be identified. The identified regions of the original verification image are then blurred to form a display verification image (block 512).

Figure 9B:
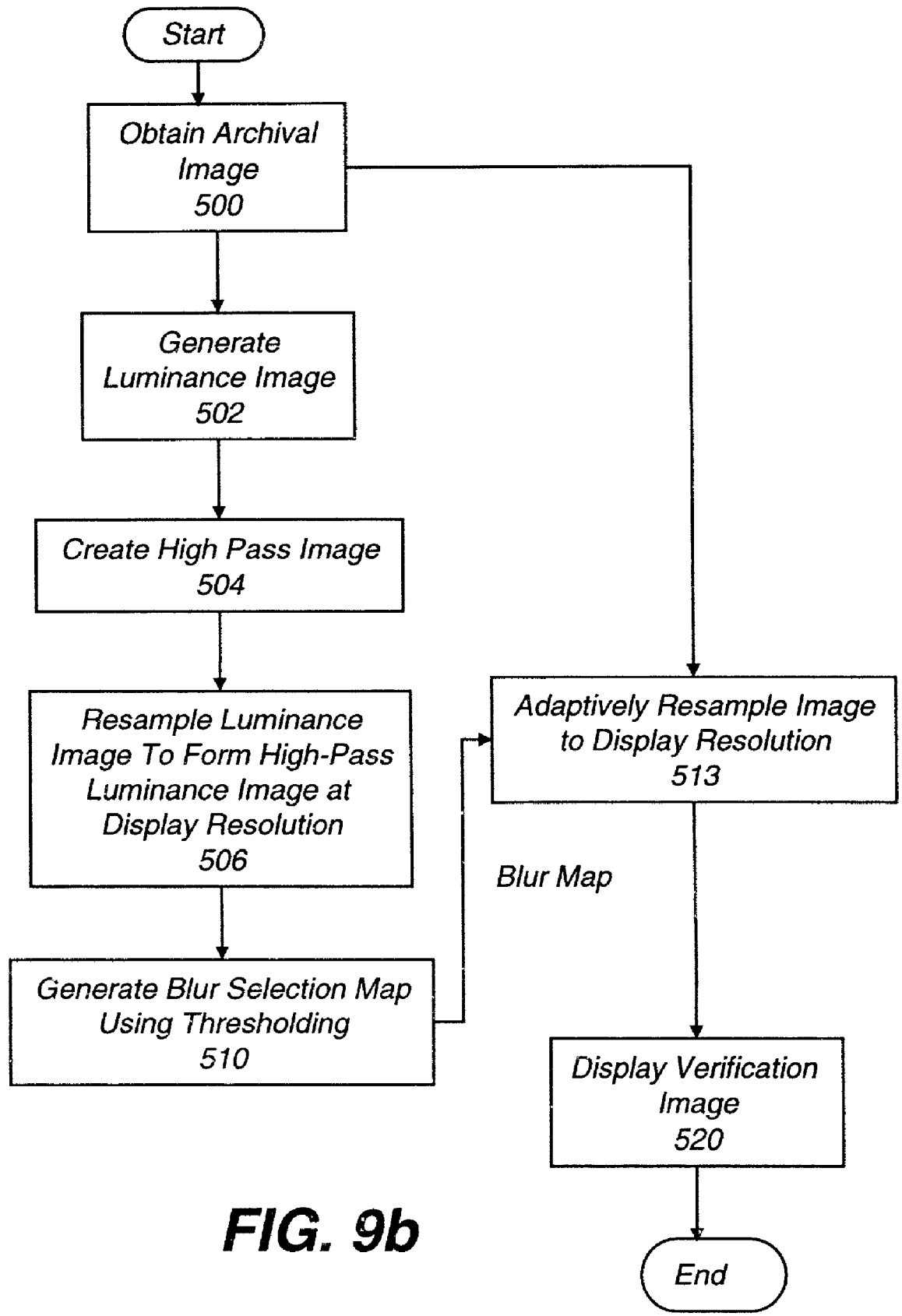
FIG. 9b is a flow diagram in block form of another embodiment of the present invention.

In the embodiment of FIG. 9b, the blur map created in block 510 is used to adaptively resample the archival image, to produce the display resolution image (block 113). The adaptive resampling introduces an appropriate amount of blur into the display resolution image, determined by the blur selection map. Although not shown in FIG. 9b, the digital zoom factor and anticipated rendered image size can also be used as an additional input in setting the blur level, as described earlier in relation to FIG. 3b.

Figure 10:
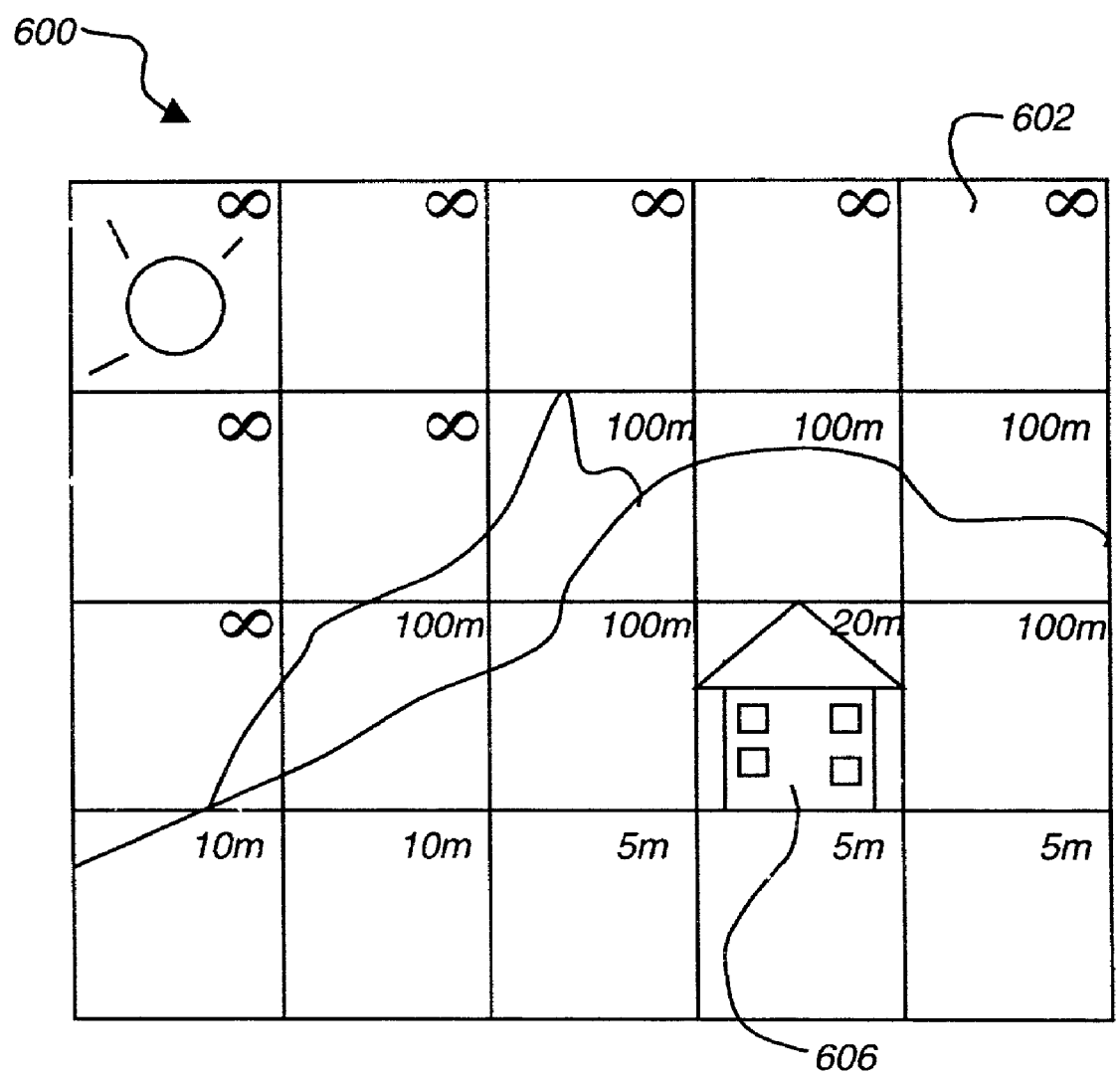
FIG. 10 shows an embodiment of a scene as viewed by a multispot ranger.
Figure 11:
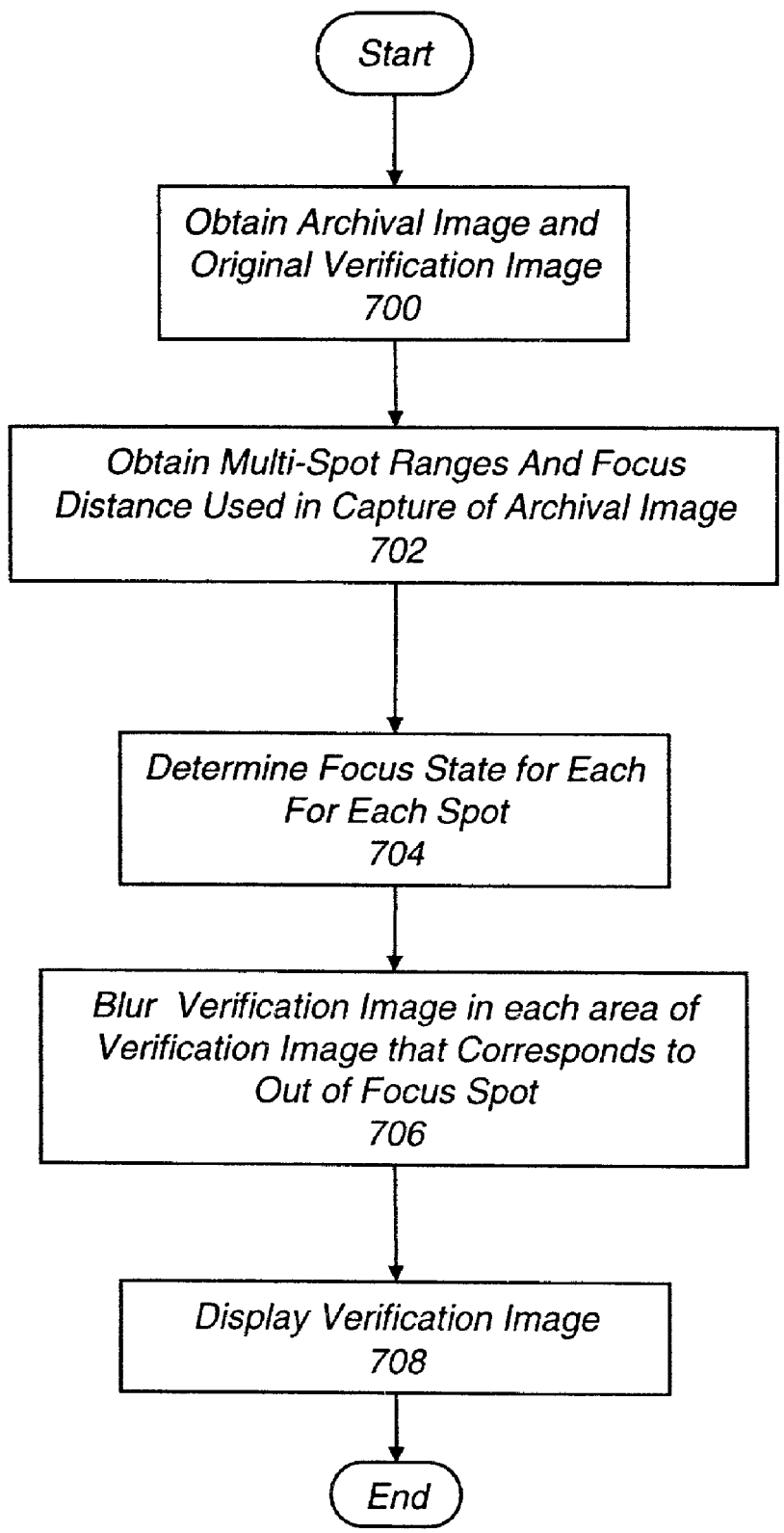
FIG. 11 is a flow diagram in block form showing a another embodiment of the method of the present invention using range finding data.

In another embodiment shown in FIGS. 10 and 11, out of focus areas in an archival image are detected in ways that do not require image analysis of the archival image. In this embodiment out of focus regions in an archival image using multi-spot distance data generated by rangefinder 48. This embodiment is also suitable for use in conjunction with the embodiments of FIGS. 3a and 3b. (block 74 and block 84 respectively). As is shown in FIG. 10, rangefinder 48 uses multi-spot rangefinding techniques to divide the scene 600 into a grid of areas or spots 602, and determine optimum focus distances for each region. The rangefinder 48 provides a distance for each region to the camera microprocessor 50.

The camera microprocessor 26 then identifies a distance to a subject 606 and causes lens driver 30 to adjust taking lens unit 22 to focus at the identified subject distance.

As is shown in FIG. 11, an archival image and original verification image are first obtained (block 700). As the archival image is captured, multi-spot distance ranges are obtained for each of the spots measured by the multi-spot range finder 48 (block 702). Further, the focus distance used in the capture of the archival image is determined. Where camera 20 is used to capture the archival image, the focus distance settings can be obtained from camera microprocessor 50. Next, the focus state for each spot is determined (block 704). This involves determining the difference between the optimum focus distance for each individual spot, and the focus distance used in the capture of the archival image. For example, if the optimum focus distance for a given spot is 10 meters, and the focus setting of taking lens unit 22 is five meters, a difference of five meters can be identified for this spot. However, it is not clear from this information alone, whether the portion of the image represented by that spot is in focus. This is because taking lens unit 22 and image sensor 24 combine to have a near depth field that extends in front of the lens focus distance, and a far depth of field that extends beyond the lens focus distance of the lens taking unit. The near and far depth of fields for a lens can be determined from the following equations:

Near depth of field=$(H \times D)/(H+D-F)$, and

Far depth of field=$(H \times D)/(H-D+F)$ where $$H = \frac{F^2}{A \times Cb}$$

and
D is the focus distance
F is the lens focal length
A is the lens f/number, and
Cb is the blur circle limit on the sensor When any spot has an optimum focus distance that is not between the near and far depth of fields, this spot is determined to be out of focus. Such a spot will be identified for blur by providing a blur map equal to 1.

Alternatively, because in such a system it is possible to determine the distance range in each spot and the focus distance with some accuracy, the degree of deviation between these distances can be determined and areas having greater deviations can be identified, so that the blur map can be provided using many different values of blur, where 0 indicates no blur, and higher values indicate more apparent blur.

The spots are then mapped against the verification image and the verification image is blurred in each area that is determined to have an out of focus state using the steps described with respect to the embodiments of FIGS. 3a and 3b to accomplish this result (block 78 and block 86). This modifies the verification image to visibly blur the out of focus areas (block 706). Optionally in this step, if the blur map provides many different blur levels, the amount of blur introduced in a particular area of the display verification image can be tailored so that the extent of the visible blur is proportional to the degree of misfocus in this area of the archival image. Finally such images are displayed using display 42 (block 708).

Although creation of the blur map in accordance with one embodiment has been described with reference to dividing the block of discrete cosine transform coefficients into quadrants, it will be appreciated by those skilled in the art that other methods of grouping and logically evaluating the AC coefficients could be used to arrive at similar objectives. One such method could involve examining all AC coefficients in each block of transform coefficients and comparing all AC coefficients to a predetermined threshold value to produce the blur map. Alternatively, instead of the discrete cosine transform, many other alternative transform basis functions could be used. In addition, although another embodiment has been described with reference to examining at least three high-pass sub-bands to create the blur map, it will be appreciated that the blur map could be created by examining only one of the high-pass sub-bands. Furthermore, while another embodiment uses a high pass filter to generate a blur map, suitable blur maps could alternatively be obtained using various bandpass filters, adaptive filters, or edge detection techniques. Moreover, while another embodiment uses a separate range finder to determine the optimum focus distance for various focus spots, this determination could be alternatively accomplished using the image sensor 24 and "through focus" scanning techniques, such as described in U.S. Pat. No. 5,877,809 cited earlier.

Figure 12:
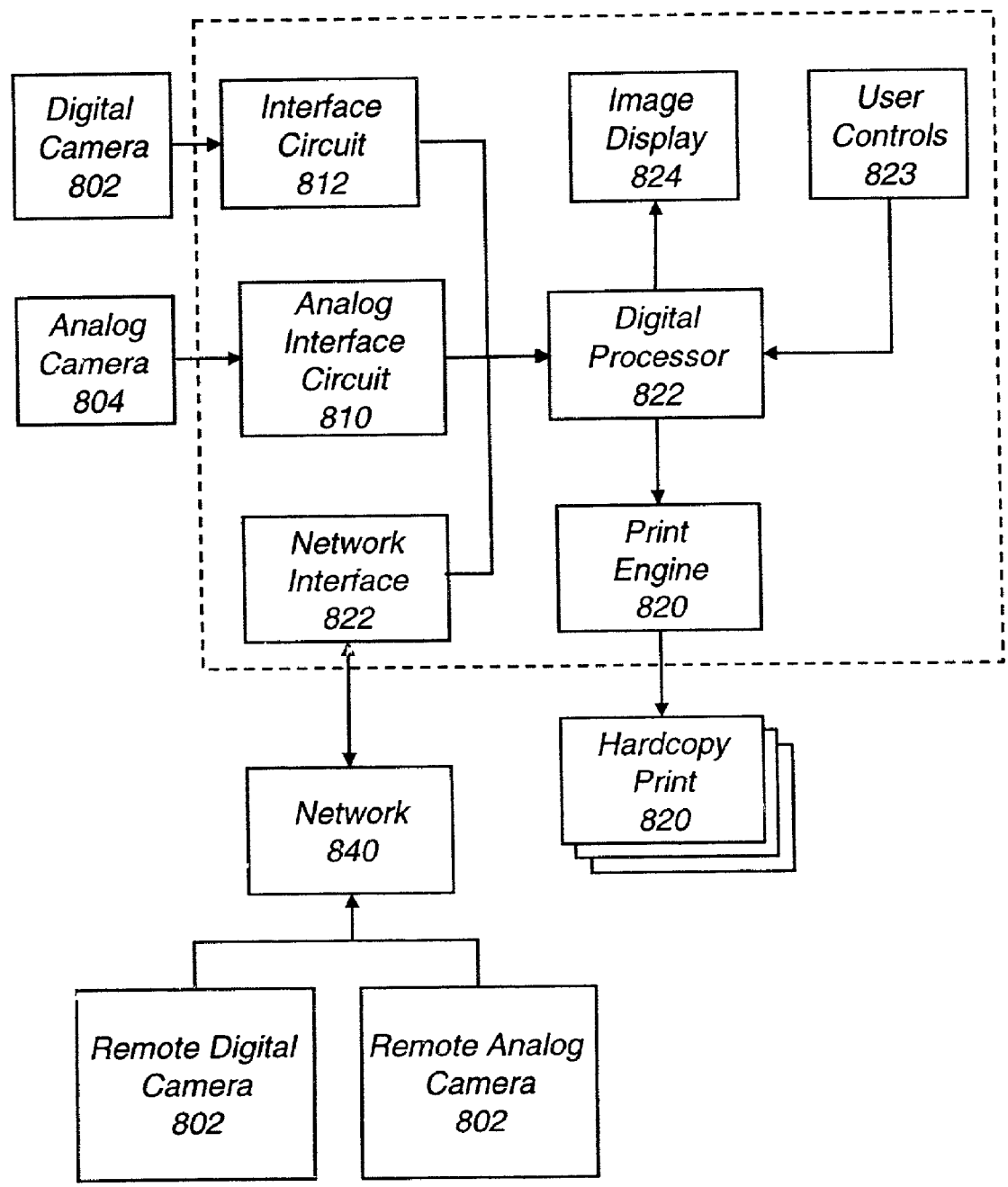
FIG. 12 shows an embodiment of a camera system having a verification display.

It will be appreciated that the present method can also be practiced by any imaging device including a low resolution image display, such as the camera system 800 shown in FIG. 12. In camera system 800, archival images are obtained from many different image sources. Examples of such sources include film exposed in a conventional camera (not shown) which is developed and scanned by film scanner 802 to provide an archival image via interface circuit 812 to the digital processor 822. The interface circuit 812 can utilize the well-known Uniform Serial Bus or IEEE 1394 interfaces, or many other types of wired or wireless interfaces. Such an image can also be provided by a digital camera 802, to the host computer interface 34 to the interface circuit 812, which can provide the archival image to the digital processor 822. Such an archival image can also be captured using an analog camera 804. Such analog camera is connected to an analog digital converter which can provide the archival image to digital processor 822. Either of digital camera 802 or analog camera 804 can be remote from digital signal processor 822 and connected thereto by way of network interface 814.

The camera system 800 includes a print engine 820, which produces hardcopy prints 830. Print engine 820 can use ink jet, electrophotographic, thermal dye printing, or many other types of printing technologies. The digital processor 822 is connected to an image display 824 and user controls 823. These provide a graphical user interface that enable images to be selected for printing, as described in commonly assigned co-pending U.S. patent application Ser. No. 09/638,787 filed Aug. 15, 2000 (Parulski et al.) "A Color Printer Having A Graphical User Interface For Displaying And Selecting Images For Local And Remote Printing", the disclosure of which is incorporated herein by reference.

Since the image display 824 is typically a small LCD display or video display having a relatively lower image output resolution than the captured archival image, it is not possible to fully judge the sharpness of the archival image using display 824. As a result, the user may select images for printing that are not suitably sharp, and provide low quality images when printed as hardcopy prints 830. This can cause the user to waste expensive printer consumables. Therefore, the methods of the embodiments described above can be used to provide a verification image for display on image display 824 which indicates to the user whether or not the archival image will be suitably sharp.

Figure 13:
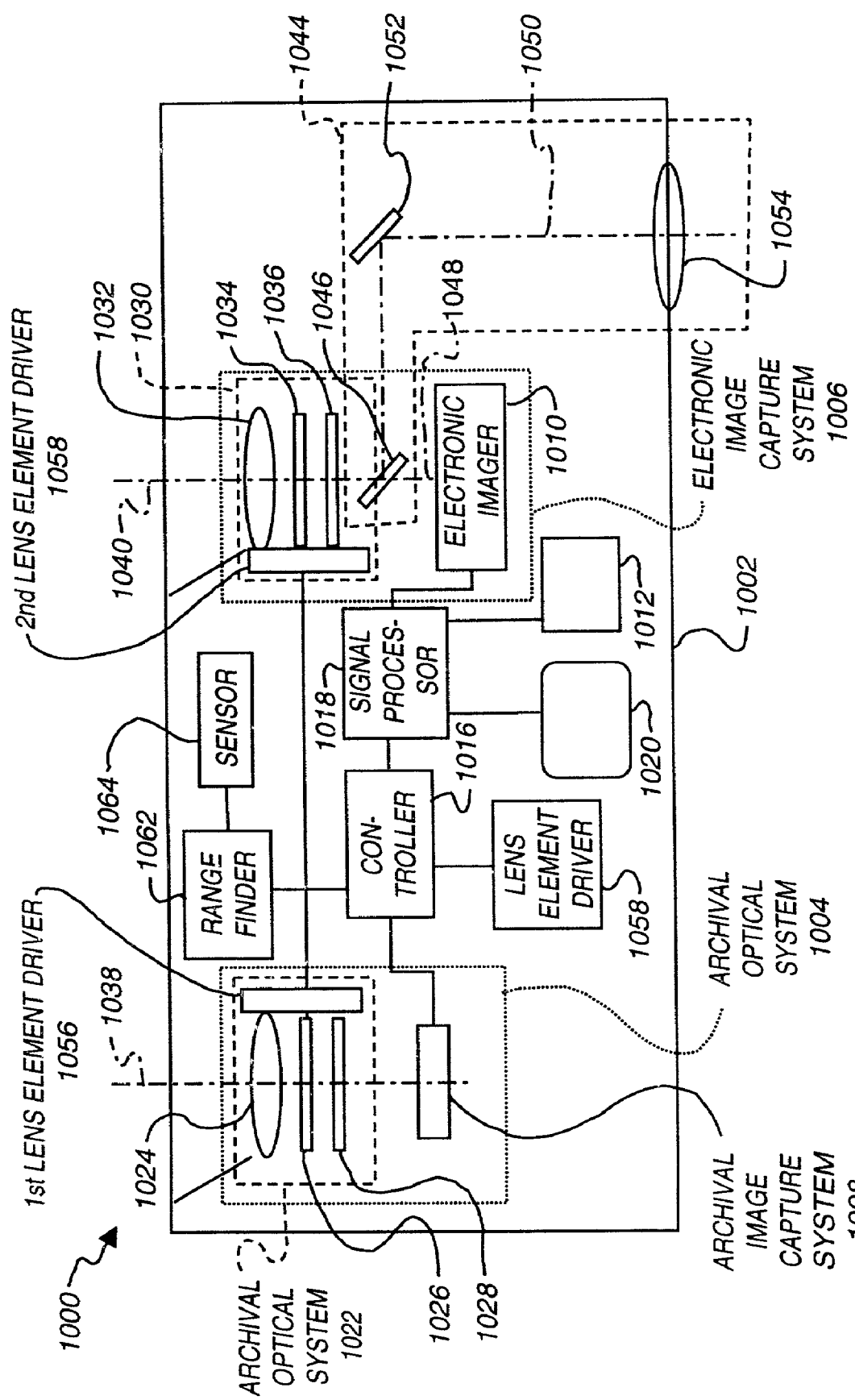
FIG. 13 shows another embodiment of a camera system of the present invention having two image capture systems.

Referring now to FIG. 13, a schematic diagram of one embodiment of a verifying camera 1000 having dual image capture systems is shown. A principal purpose of such a camera is to provide the user of the camera with a verification image where the archival image is captured using a capture system that does not readily lend itself to the generation of verification images. Typically this is done in hybrid cameras that capture archival images on film. However certain cameras use two electronic image capture systems where it is difficult to use the archival image capture system to form preview images or where it is desired to provide an electronic viewfinder function.

Camera 1000 has a body 1002 that holds an archival image capture unit 1004 and an electronic image capture unit 1006. The two different image capture units, 1004 and 1006, can take a variety of forms and can be completely separate from each other or can share some or most components. The archival image capture unit 1004 captures archival images using an archival image capture system 1008. Archival image capture system 1008 can comprise an electronic imager, a photographic film and shutter arrangement, or other archival image capture and storage systems. The electronic image capture unit 1006 captures electronic images using an electronic imager 1010. A memory 1012 is also shown and is adapted to receive and store electronic images that are captured by the electronic image capture unit 1006.

Camera 20 has an archival optical system 1022 mounted in the body 1002. As shown in FIG. 13, archival optical system 1022 comprises several groups of lens elements 1024, 1026 and 1028 that direct light from the scene to form an image on the archival image capture system 1008. Electronic optical system 1030 is also provided to focus light from the scene onto electronic imager 1010. As shown in FIG. 13, optical system 1030 has several groups of lens elements 1032, 1034, and 1036. This too is illustrative and is not limiting.

As is shown in FIG. 13, the optical axis 1038 of archival optical system 1022 is separated from the optical axis 1040 of the electronic optical system 1030. This creates a potential parallax variation. To correct for the parallax variation, the archival optical system 1004 and electronic optical system 1006 are arranged so that the object angle of the archival optical system 1004 and electronic optical system 1006 overlap at all possible object image planes. The electronic image captured by the electronic image capture system 1006 is modified so that the field of view of the electronic image matches the field of view of archival image capture system 1004.

Archival optical system 1022 is motorized so that one or more of elements such as elements 1024 and 1026 are driven, relative to a stationary element or elements, such as element 1028 by an first lens element driver 1056. The electronic optical system 1030 also has a mobile element or elements, such as elements 1032 and 1034 driven, relative to a stationary element or elements, such as element 1036 by a second lens element driver 1058. The different lens element drivers 1056 and 1058 are coupled so as to move together, either mechanically (not shown) or by a control system such as camera microcontroller 1016 which signals the preview lens element drivers 1056 and 1058 to move the lens elements of systems 1022 and 1030 over the same or comparable ranges of focal lengths at the same time. Sensors (not shown) track the movement of the lens element drivers to provide positioning feedback so that camera microcontroller 1016 can determine the focus distance and zoom settings of optical systems 1022 and 1030.

In the embodiment shown in FIG. 13, an optical viewfinding system 1044 is also provided. The optical viewfinding system 1044 comprises a partially transmissive mirror 1046, shown positioned in archival optical system 1022. Partially transmissive mirror 1046 subdivides light traveling along electronic optical system axis 1040 between an imager subpath 1048 to imager 1010 and a viewfinder subpath 1050 that is redirected by a fully reflective mirror 1052 and transmitted through an eyepiece 1054 to the photographer. It will be appreciated that other conventional viewfinding systems can be used. It will also be appreciated that electronic image capture system 1006 can capture a stream of images that can be displayed on display 1020 in real time and used for viewfinding.

When the photographer decides to capture an image, the photographer trips a shutter release 1058, and a signal is transmitted to a camera controller 1016. Camera controller 1016 can take the form of an appropriately configured microcomputer, such as an embedded microprocessor having RAM or other memory for data manipulation and general program execution. In a preferred embodiment, camera 1000 is autofocusing. Thus, when camera controller 1016 detects the signal from shutter release 1058, causes a distance from camera 1000 to the subject of an image to be determined and focuses optical systems 1022 and 1032 focused at the determined subject distance.

The distance from camera 1000 to the subject can be detected using conventional autofocusing techniques. In the embodiment of FIG. 13, the autofocusing system uses a rangefinder 1062 that includes a sensor 1064. Sensor 1064 can comprise a photometric or sonic sensor. Rangefinder 1062 operates lens element drivers 1022 and 1030 directly or through controller 1016 to move one or more of focusable elements 1024, 1026, 1032 and 1034. Rangefinder 1062 can be passive or active, or a combination of the two. Preferably, rangefinder 1062 is of the multi-spot autofocus type. In this regard, the scene to be captured is divided into a grid of regions or spots and the optimum focus distance for each spot is determined using data from sensor 1064.

In an alternative embodiment, the subject distance can be determined by analyzing a set of images that are captured by electronic image capture system 1006 at different focus distances. In a first embodiment of this type, the through focusing method as described above is used. Using this embodiment, a focus distance for the electronic image capture system 1006 can be determined. This focus distance can be used for setting a focus distance for the archival optical system 1022.

Camera controller 1016 generates a signal causing archival image capture system 1008 to capture an image of the scene. At substantially the same time, camera controller 1016 transmits a signal to signal processor 1018 causing signal processor 1018 to receive at least one electronic image from electronic image capture system 1010. The electronic image as captured is referred to generically herein as an "electronic image". It is important to ensure that the verification image accurately represents the appearance of the archival image. Accordingly, various corrections are typically applied to the electronic image. These corrections include conforming the electronic image to match the zoom, aspect ratio, composition, color and brightness of the archival image. The electronic image is also typically compensated to correct for parallax problems. The corrected electronic image presented to the user as a verification image using display 1020.

It is particularly important in verifying cameras 1000 to ensure that the apparent focus of the verification image matches the apparent focus of the archival image. It will be appreciated however, that merely matching the focus distance of the archival image capture unit 1004 with the focus distance of the electronic image capture unit 1006 does not necessarily guarantee that the appearance of the verification image will match the appearance of the archival image. There are a number of reasons for this. First, the depth of field of electronic image capture unit 1006 is typically greater than the depth of field of the high resolution image capture unit 1004. Thus, even when set at the same focus distance portions of the verification image appear to be in focus while corresponding portions of the archival image are not in focus. Further, the apparent sharpness of the electronic image will be increased when the image is presented on the display. Further, when the archival image is rendered at larger sizes, the archival image will proportionately appear more out of focus. All of these factors must be compensated for in order to present verification image that has an appearance that can be used by the photographer to ensure that portions of the captured archived image is or is not in focus.

Figure 14:
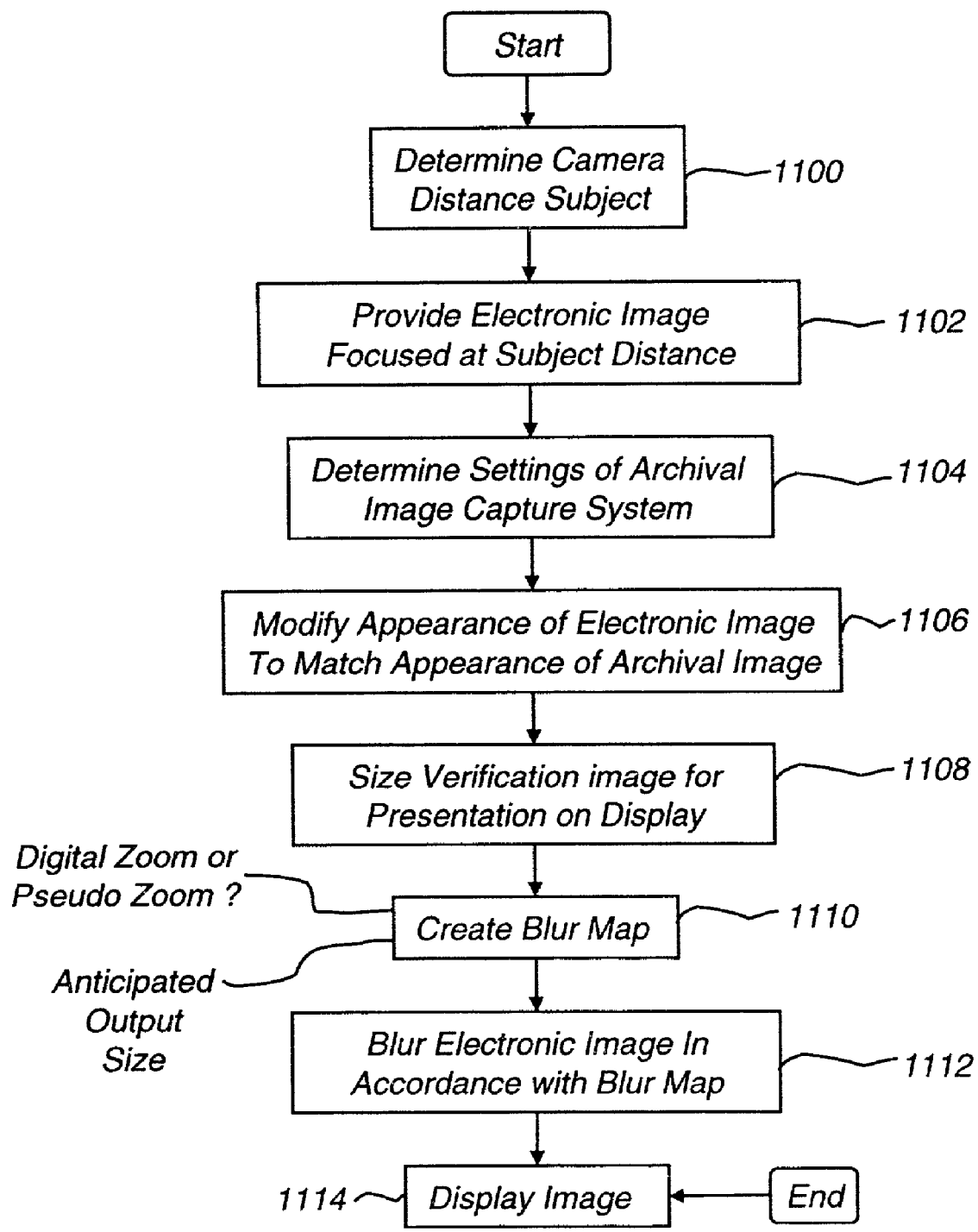
FIG. 14 shows a diagram of a method for generating a verification image in a camera having two image capture systems.

FIG. 14 shows a method for generating a verification image in a hybrid camera. In this method, the scene is divided into multiple spots and the distance from the camera to each spot is identified. (block 1100) This can be done in conventional manner using rangefinder 1062 as described above. Alternatively this can be done using through focus techniques as described above.

Once that the distance from the camera to the subject has been identified for the subject, an electronic image that is focused at that distance is obtained. (block 1102) The image capture characteristics of the archival image capture system 1004 are then obtained. (block 1104). These characteristics can include but are not limited to the focused distance, color settings, focal length, aspect ratio and film speed and type (where film is used). Based on this information, the electronic image is then modified as described above to match the appearance of the archival image. (block 1106) These modifications can include but are not limited to cropping or zooming the electronic image to match the aspect ratio of the archival image, the color, brightness and content of the archival image and the composition of the archival image. The electronic image is further sized for presentation on display 1020 (block 1108) and, in this corrected form comprises a verification image that closely matches the appearance of the archival image.

The verification image is further modified to ensure that out of focus areas of the archival image appear out of focus when viewed on display 1020. (block 1012) However it will be recognized that in many cameras having two image capture systems, the depth of field of the archival image capture unit 1004 will be less than the depth of field of the electronic image capture system 1006. Further there may be variations in the focus distance of the archival image capture unit 1004 and the electronic image capture unit 1006. Accordingly, image analysis of the verification image will not necessarily identify out of focus portions of the archival image. To compensate for this effect, out of focus portions of the archival image are identified in accordance with the embodiment described above with respect to FIGS. 10 and 11.

As applied to camera 1000, the methods of FIGS. 10 and 11 determine known distances from camera 1000 to each spot in a scene. The distances are compared against an in focus range that is defined as the area between the near depth of field and far depth of field. Importantly, however, in this embodiment the near and far depth of field are calculated based upon the focus distance and depth of field of the archival image capture unit 1004 and not the focus distance and depth of field of the electronic image capture unit 1006. Spots having an optimum distance that are outside of the depth of field of the archival image capture system are identified as being out of focus while spots having a distance that is inside the focus range of the archival image are identified as being in focus. A blur map is formed on the basis of whether a portion is inside the range or outside of the range. (block 1110)

Camera 1000 can be adopted to provide a digital zoom or pseudo zoom feature. These features allow the user to designate that only a portion of the image that is captured is to be used in rendering an output image. In cameras having a digital archival image capture unit 1008, a digital zoom designation can cause one of two effects: the digital image itself can be cropped to include only image information within the area of zoom or metadata can be recorded with the digital image indicating the area of zoom and the desire of the photographer to have the rendered output image include only such data. In film cameras, a designation is usually recorded on the film using optical, magnetic or physical markings. During photofinishing, properly equipped photofinishing equipment will detect these markings and produce prints or other output using only the imaging information contained within the areas of interest. This simulates the effect of zooming the image into the area of interest. However, this reduces the overall imaging information available for use in rendering the output, thus reducing the apparent sharpness of the printed image.

Accordingly, in the method of FIG. 14, the step of forming the blur map (block 1110) further comprises the step of determining which areas of the archival image are within the areas of the archival image that are incorporated into the digital or pseudo zoom region and identifying which areas will appear to be out of focus when the archival image is rendered. Further, when camera 1000 incorporates a rendered output indicator as is described above, the step of forming the blur map will also comprise determining which portions of the archival image will appear out of focus when the image is rendered at the anticipated rendered output size.

This blur map is used as the basis for modifying the verification image to create the appearance of blur in the verification image when the verification image is presented on the display. (block 1112) The blur can be induced in any of the manners that are described above. The blur modified verification image is then presented on display 1020. (block 1114)

It will be appreciated that in this method, there may be portions of the verification image which provide visible blur when presented on display 1020 without blur enhancing modification. Blurring these portions of the verification image could lead the photographer to reach erroneous conclusions about the extent to which such portions will appear out of focus. Accordingly, this embodiment of the present invention can perform the extra steps of examining each portion of the verification image to determine which portions of the verification image will appear out of focus when presented on display 1020 and selectively defining the extent of blur induced in each region of the verification image to compensate for the presence of such blur.

Computer programs or software for implementing the method described herein can be stored on a computer readable medium. The computer readable storage medium may comprise, for example, magnetic storage media such as a magnetic disc (e.g., a floppy disc) or magnetic tape; optical storage media such as an optical disc, optical tape, or a machine readable bar code; solid state electronic storage devices such as random access memory (RAM) or read only memory (ROM); or any other physical device or medium employed to store a computer program.

The invention has been described with particular reference to certain preferred embodiments thereof. However, it will be appreciated that variations and modifications can be effected by a person of ordinary skill in the art without departing from the spirit and scope of the invention.

What is claimed:

1. A method for using a display having a predetermined display resolution to show out of focus areas in an archival image having a greater resolution than the predetermined display resolution, the method comprising the steps of:

providing a verification image sized for presentation on the display;

identifying portions of the archival image that are out of focus; and, blurring the verification image so that portions of the verification image that correspond to out of focus portions of the archival image appear out of focus when the verification image is presented on the display, wherein the step of blurring the verification image further comprises using a contrast sensitivity function, based upon the distance from the viewer to the display and the imaging resolution and the size of the display, to determine the extent to which portions of the verification image must be blurred so that they appear out of focus when the verification image is displayed on the display.

2. The method of claim 1, wherein the step of blurring the verification image further comprises modifying the verification image so that when the verification image is presented on the display, portions of the verification image that correspond to portions of the archival image that are relatively more out of focus appear to be more out of focus than portions of the archival image that are relatively less out of focus.

3. The method of claim 1, wherein the step of identifying the out of focus portions of the archival image comprises the steps of:

generating a luminance image based upon the archival image, creating a high pass image of the luminance image, resampling the high pass luminance image to form a high pass luminance image at display resolution, using the threshold test to generate a blur selection map, and using the blur selection map to identify portions of the archival image that are out of focus.

4. The method of claim 3, further comprising the steps of applying multiple threshold tests to the compressed high pass luminance image to generate multiple blur maps and comparing the blur maps to identify the extent to which various portions of the archival image are out of focus.

5. The method of claim 4, wherein the step of blurring the verification image further comprises the step of modifying the verification image so that when the verification image is displayed, portions of the verification image that correspond to portions of the archival image that are relatively more out of focus appear to be more out of focus than portions of the verification image that are relatively less out of focus.

6. The method of claim 4, wherein the step of blurring the verification image comprises adaptively resampling the archival image based upon the blur selection map.

7. The method of claim 1, wherein the step of blurring the verification image further comprises reducing spatial frequencies of the verification image corresponding to out of focus areas in the range of between 0.08 cycles per sample to 0.5 cycles per sample.

8. The method of claim 1, wherein the step of blurring the verification image further comprises reducing spatial frequencies of the verification image corresponding to out of focus areas in the range of between 1.3 cycles per degree to 8.4 cycles per degree.

9. The method of claim 1 wherein the step of identifying which portions of the archival image are out of focus comprises the steps of: portioning the archival image into multiple range finding spots; obtaining a range finding distance for each spot; and using the range finding distance for each spot to identify whether the portion of the archival image associated with each spot is out of focus.

10. The method of claim 9, wherein the step of using the range finding distance for each spot to identify whether the portion of the out of the archival image associated with each spot is out of focus comprises:

obtaining the focussed distance of an image sensor and a lens taking unit that focuses light on to the image sensor;

determining the depth of field of the image sensor and lens taking unit; and determining that a spot is out of focus based upon the range finding distance, the focussed distance and the depth of field.

11. The method of claim 1, further comprising the step of identifying the extent to which portions of the archival image are out of focus wherein the steps of providing a verification image and blurring the verification image comprise adaptively resampling the archival image to form a verification image having corresponding portions that appear to be proportionately more out of focus.

12. The method of claim 1, wherein the step of blurring the verification image further comprises defining at least one set of subdivisions within each out of focus area of the verification image and averaging the chrominance and luminance values within each sub-division, and wherein the size of the subdivisions is defined so that they create a visible blur in the verification image when the verification image is presented on the display.

13. The method of claim 12, further comprising the step of identifying the extent to which portions of the archival image are out of focus and wherein proportionately larger subdivisions are defined within portions of the verification image that are relatively more out of focus and wherein smaller subdivisions are defined within portions of the verification image that are more in focus.

14. The method of claim 1, wherein the step of blurring the verification image further comprises applying at least one blur kernel to each identified out of focus area with said blur kernel defined so that it creates a visible blur in the verification image when the verification image is presented on the display.

15. The method of claim 14, further comprising the step of identifying the extent to which portions of the archival image are out of focus wherein more than one blur kernel is applied to the verification image with each of the blur kernels inducing a different relative amount of apparent blur in the verification image and with the blur kernels applied so that portions of the verification image that are more out of focus appear to be proportionately more out of focus.

16. A method for using a display having a predetermined display resolution to show out of focus areas in an archival image having a greater resolution than the predetermined display resolution, the method comprising the steps of:
  providing a verification image sized for presentation on the display;
  identifying portions of the archival image that are out of focus;
  detecting a digital zoom setting; and,
  blurring the verification image so that portions of the verification image that correspond to out of focus portions of the archival image appear out of focus when the verification image is presented on the display,
  wherein the step of identifying out of focus portions comprises identifying portions of the archival image that will be out of focus when the archival image is enlarged to the digital zoom setting.

17. A method for using a display having a predetermined display resolution to show out of focus areas in an archival image having a greater resolution than the predetermined display resolution, the method comprising the steps of:
  providing a verification image sized for presentation on the display;
  identifying portions of the archival image that are out of focus;
  detecting an anticipated output size setting; and
  blurring the verification image so that portions of the verification image that correspond to out of focus portions of the archival image appear out of focus when the verification image is presented on the display,
  wherein the step of identifying out of focus portions comprises identifying portions of the archival image that will be out of focus when the archival image is enlarged to the anticipated output size.

18. A method for forming a verification image that indicates out of focus portions of an archival image using a display having a resolution that is lower than the resolution of the archival image, the method comprising the steps of:
  obtaining an archival image;
  generating a luminance image based upon the obtained archival image;
  resampling the luminance image to form a high pass luminance image at display resolution;
  generating a blur map corresponding to the resampled display resolution image by applying a threshold test to the high pass luminance image;
  providing a display resolution image matching the appearance of the archival image; and
  blurring the display resolution image in accordance with the blur map resolution image so that out of focus areas in the display resolution image appear to be out of focus when viewed on the display,
  wherein the step of generating a luminance image comprises applying a finite impulse response high pass filter to the archival image; and
  wherein the threshold is determined by applying a histogram to the display resolution high-pass luminance image and determining a threshold value that identifies a predetermined percentage of the image data as being out of focus.

19. The method of claim 18, further comprising the steps of detecting conditions including the focal length of the optical system used to capture the archival image, the depth of field of the archival optical system, and the focus distance of the archival optical system wherein the step of generating a luminance image comprises using the detected conditions to select a finite impulse high pass filter that is adapted for such conditions and applying the selected finite impulse high pass filter to the verification image to induce blur.

20. The method of claim 18, wherein the step of generating a blur map comprises applying more than one threshold to the high pass display resolution display image to generate multiple blur maps and comparing the blur maps to identify portions of the archival image that are more out of focus than other portions of the archival image that are out of focus.

21. The method of claim 18, further comprising the step of blurring the resampled display resolution image to a greater apparent extent in portions that correspond to portions of the archival image that are more out of focus than in portions of the resampled display resolution image that correspond to the other portions of the archival image.

22. The method of claim 18, wherein the steps of providing the display resolution image and blurring the display resolution image comprise adaptively resampling the archival image in accordance with the blur map.

23. A method for forming a verification image that indicates out of focus portions of an archival image using a display having a resolution that is lower than the resolution of the archival image, the method comprising the steps of:
  obtaining an archival image;
  generating a luminance image based upon the obtained archival image;
  resampling the luminance image to form a high pass luminance image at display resolution;
  generating a blur map corresponding to the resampled display resolution image by applying a threshold test to the high pass luminance image;
  providing a display resolution image matching the appearance of the archival image; and
  blurring the display resolution image in accordance with the blur map resolution image so that out of focus areas in the display resolution image appear to be out of focus when viewed on the display,
  wherein the step of generating a blur map further comprises detecting a digital zoom signal and selecting a threshold based upon the digital zoom signal.

24. A method for forming a verification image that indicates out of focus portions of an archival image using a display having a resolution that is lower than the resolution of the archival image, the method comprising the steps of:
  obtaining an archival image;
  generating a luminance image based upon the obtained archival image;
  resampling the luminance image to form a high pass luminance image at display resolution;
  generating a blur map corresponding to the resampled display resolution image by applying a threshold test to the high pass luminance image;
  providing a display resolution image matching the appearance of the archival image; and
  blurring the display resolution image in accordance with the blur map resolution image so that out of focus areas in the display resolution image appear to be out of focus when viewed on the display,
  wherein the step of generating a blur map further comprises detecting a pseudo zoom setting and selecting a threshold based upon the pseudo zoom signal.

25. A method for forming a verification image that indicates out of focus portions of an archival image using a display having a resolution that is lower than the resolution of the archival image, the method comprising the steps of:
  obtaining an archival image;
  generating a luminance image based upon the obtained archival image;

resampling the luminance image to form a high pass luminance image at display resolution;

generating a blur map corresponding to the resampled display resolution image by applying a threshold test to the high pass luminance image;

providing a display resolution image matching the appearance of the archival image; and blurring the display resolution image in accordance with the blur map resolution image so that out of focus areas in the display resolution image appear to be out of focus when viewed on the display, wherein the step of generating a blur map further comprises detecting a setting indicating the anticipated size of the rendered output image and selecting a threshold based upon the setting.

* * * * *

UNITED STATES PATENT AND TRADEMARK OFFICE
CERTIFICATE OF CORRECTION

PATENT NO. : 7,053,953 B2 Page 1 of 1
APPLICATION NO. : 10/028644
DATED : May 30, 2006
INVENTOR(S) : Steven M. Belz, et al.

It is certified that error appears in the above-identified patent and that said Letters Patent is hereby corrected as shown below:

Column 24, line 20, claim 10 delete "of the out"

Signed and Sealed this

Third Day of October, 2006

JON W. DUDAS
*Director of the United States Patent and Trademark Office*